(12) United States Patent
Goldentouch

(10) Patent No.: US 8,554,800 B2
(45) Date of Patent: Oct. 8, 2013

(54) SYSTEM, METHODS AND APPLICATIONS FOR STRUCTURED DOCUMENT INDEXING

(75) Inventor: Lev Goldentouch, Rishon Lezion (IL)

(73) Assignee: Portool Ltd., Rishon Lezion (IL)

( * ) Notice: Subject to any disclaimer, the term of this patent is extended or adjusted under 35 U.S.C. 154(b) by 457 days.

(21) Appl. No.: 12/511,747

(22) Filed: Jul. 29, 2009

(65) Prior Publication Data

US 2010/0030752 A1 Feb. 4, 2010

Related U.S. Application Data

(60) Provisional application No. 61/084,633, filed on Jul. 30, 2008.

(51) Int. Cl.
*G06F 7/00* (2006.01)

(52) U.S. Cl.
USPC .......................................... 707/797

(58) Field of Classification Search
USPC .................. 707/797, 693, 711, 741, 999.003
See application file for complete search history.

(56) References Cited

U.S. PATENT DOCUMENTS

| | | | | |
|---|---|---|---|---|
| 5,852,822 A * | 12/1998 | Srinivasan et al. | ..................... | 1/1 |
| 6,560,620 B1 * | 5/2003 | Ching | ........................... | 715/229 |
| 7,721,188 B2 * | 5/2010 | Abe et al. | ...................... | 715/200 |
| 7,823,057 B1 * | 10/2010 | Schultz et al. | ................ | 715/229 |
| 2001/0037324 A1 * | 11/2001 | Agrawal et al. | ................... | 707/1 |
| 2002/0065848 A1 * | 5/2002 | Walker et al. | ................. | 707/511 |
| 2002/0112082 A1 * | 8/2002 | Ko et al. | ........................ | 709/246 |
| 2003/0187864 A1 * | 10/2003 | McGoveran | .................. | 707/102 |
| 2006/0015809 A1 * | 1/2006 | Hattori | .......................... | 715/513 |
| 2006/0149775 A1 * | 7/2006 | Egnor | ........................... | 707/102 |
| 2006/0224610 A1 * | 10/2006 | Wakeam et al. | ............. | 707/101 |
| 2006/0265593 A1 * | 11/2006 | Momma et al. | ............... | 713/176 |
| 2007/0156677 A1 * | 7/2007 | Szabo | ............................. | 707/5 |
| 2008/0263101 A1 * | 10/2008 | Hara | ............................ | 707/200 |
| 2009/0113282 A1 * | 4/2009 | Schultz et al. | ............... | 715/208 |
| 2009/0138491 A1 * | 5/2009 | Chowdhury | .................. | 707/100 |
| 2009/0287674 A1 * | 11/2009 | Bouillet et al. | ................... | 707/5 |

* cited by examiner

*Primary Examiner* — Mohammed R Uddin

(74) *Attorney, Agent, or Firm* — Oren Reches

(57) ABSTRACT

A data management system, the system including: (i) an input interface for acquiring a source document; and (ii) a processor configured to: (a) divide the source document into multiple objects in response to content of the source document; (b) analyze the multiple objects to generate multiple low level sub-trees, wherein each of the low level sub-trees includes at least one of the multiple objects; (c) generate multiple mid level sub-trees, wherein each of the mid level sub-trees includes link to at least one of the low level sub-trees; (d) generate a top level sub-tree that includes multiple section links, wherein each of the section links to one of the mid level sub-trees; (e) create metadata descriptive of at least one of the sub-trees generated, wherein the metadata includes data which is not included in the source document; and (f) generate a structured document that includes the top level sub-tree, at least some of the mid level sub-trees and at least some of the low level sub-trees, and the metadata.

24 Claims, 15 Drawing Sheets

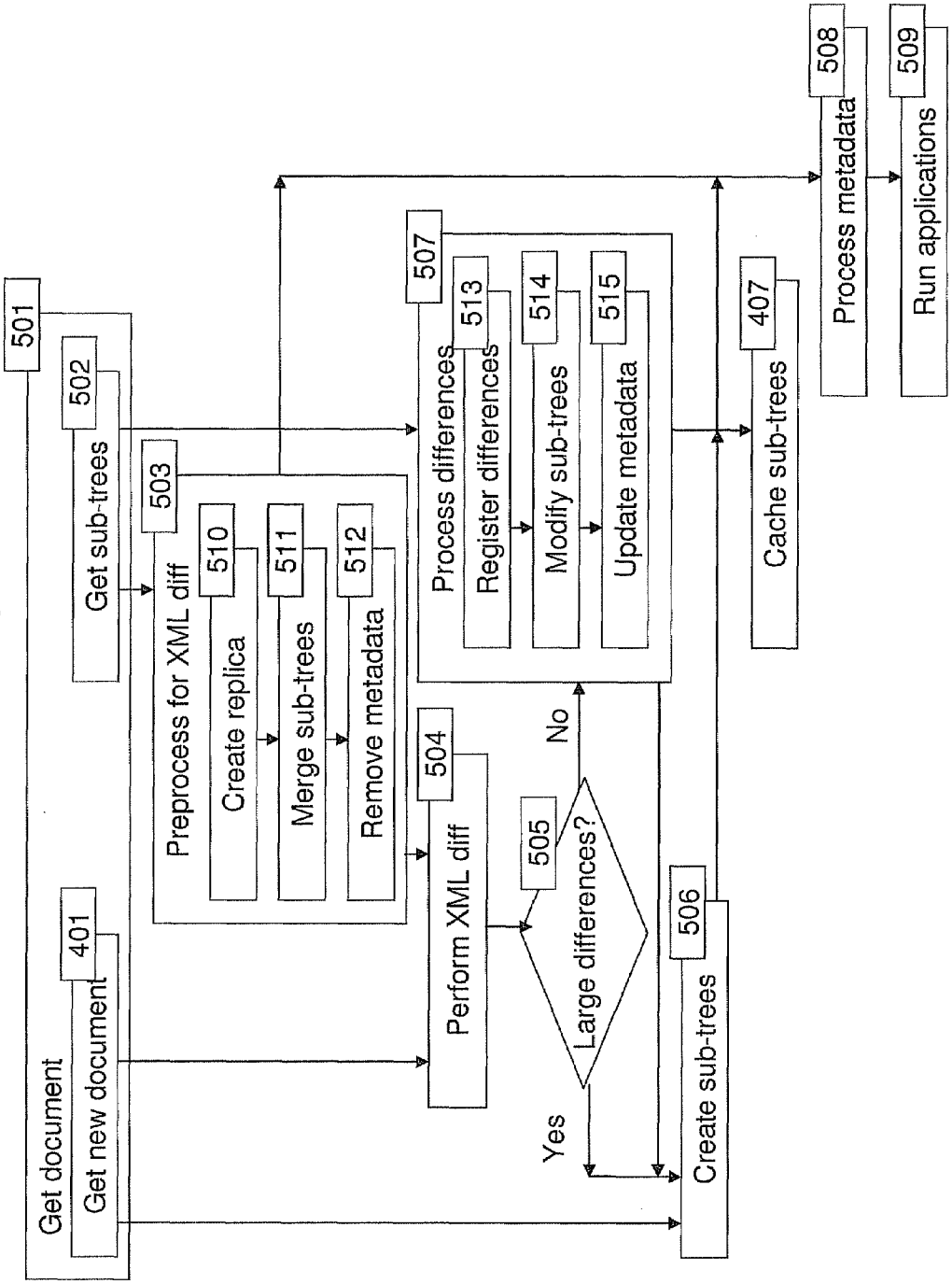

SYSTEM, METHODS AND APPLICATIONS FOR STRUCTURED DOCUMENT INDEXING

CROSS REFERENCE TO RELATED APPLICATIONS

This application claims the benefit of U.S. Ser. No. 61/084,633, filed on Jul. 30, 2008 (and entitled "System, methods and applications for structured document indexing").

BACKGROUND OF THE INVENTION

There are several widely used indexing techniques for structured documents, best suited for specific applications. Web applications and services may store HTML web pages, SOA transactions and various metadata in XML databases, such as Apache Xindice™ and MonetDB™ databases. The elements in the XML documents may be addressed via protocols such as XPointer™, via search queries such as XQuery™. The applications using XML documents may include XML comparison such as Altova DiffDog™, search engine web page indexing, HTML navigations, semantic web applications and other suitable applications. There are similar proprietary techniques for indexing Marcomedia Flash™ and Adobe Acrobat™ files, MSOffice™ documents, e-books and other suitable structured documents.

The systems and methods addressing XML documents may be modified by one skilled in art to address other types of structured and semi-structured documents.

The conventional indexing of structured documents, addresses the folders/web sites as trees and files/web pages as leaves. Typically there is no segmentation below document level. The indexing techniques for structured documents may be specifically built for the applications of interest. For example, search engines use search indices, inverted indices and suffix trees, which may be useful for search within multiple documents, but may not include section recognition and document hierarchy information. For example, XPointer™ framework forms a basis for identifying XML nodes, including a positional element addressing scheme, a scheme for namespaces, and a scheme for XPath™-based addressing. For example, XyDelta™ includes unique identifier per node and XML difference detection and encoding. It is non-trivial to derive an XML indexing method that provides sufficient performance for multiple applications.

In this patent we present a multiresolution indexing method for structured documents developed to enable search within document, contextual marking, incremental updates, granular proxy and storage of XML documents, and transcoding. Moreover, we describe how various applications may benefit from using the indexing system and methods described in this patent.

The system, methods and applications described in this patent allow overcoming the deficiencies of conventional XML indexing techniques for search, visual mark and incremental update applications, as more fully set forth herein.

FIG. 1 illustrates a prior art system for document tree representation.

The document root node 101 is a parent to several nodes, including document head node 102 and document body node 103.

The document head node 102 may contain document metadata, including title, keywords, style sheets, scripts and other metadata applicable to the scope of the whole document.

The document body node 103 may contain the object nodes 104 displayed on client's screen, including layers, tables, images, hyperlinks, forms, frames, ActiveX objects or any other suitable objects.

Object nodes 104 may recursively contain other object nodes 104, attribute nodes 105, text nodes 106, scripts or other suitable XML elements.

Attribute nodes 105 may contain object attributes and metadata, including style, name, event processing, user defined metadata and other suitable metadata.

Text nodes 106 may contain text and spaces.

The metadata storage 107 may be performed inside the document or outside the document and linked to the document. For example, search engines may keep web sites as graphs or trees, with documents as tree leaves and indexing of the content in the document as metadata.

The user data 108 may include user comments, tagging, voting, page views and other suitable user-originated metadata relevant to the document.

Search indices 109 may be implemented and A-Z book or other suitable search engine indexing method may include connection between keywords and the document. For example, for each keyword a list of documents containing the keyword may be kept. The connection appears at the level of full document, or a version of document.

Document history 110 may include document versions, update history, statistics history or other suitable history.

SUMMARY OF THE INVENTION

A method for improving data accessibility, the method including: (i) dividing the source document into multiple objects, in response to content of the source document; (ii) analyzing the multiple objects to generate multiple low level sub-trees, wherein each of the low level sub-trees includes at least one of the multiple objects; (iii) generating multiple mid level sub-trees, wherein each of the mid level sub-trees includes link to at least one of the low level sub-trees; (iv) generating a top level sub-tree that includes multiple section links, wherein each of the section links links to one of the mid level sub-trees; (v) creating metadata descriptive of at least one of the sub-trees generated, wherein the metadata includes data which is not included in the source document; and (vi) generating a structured document that includes the top level sub-tree, at least some of the mid level sub-trees and at least some of the low level sub-trees, and the metadata.

A method for accessing data, the method including: (i) acquiring from a top level sub-tree of a structured document a link to a mid level sub-tree of the structured document; (ii) acquiring from the mid level sub-tree a link to a low level sub-tree of the structured document; and (iii) retrieving the object from the low level sub-tree; wherein at least one instance of acquiring a link is responsive to a result of a comparison of a search query data with metadata which pertains to the content of multiple sub-trees, and which is included in at least one of the sub-trees.

A data management system, the system including: (i) an input interface for acquiring a source document; and (ii) a processor configured to: (a) divide the source document into multiple objects in response to content of the source document; (b) analyze the multiple objects to generate multiple low level sub-trees, wherein each of the low level sub-trees includes at least one of the multiple objects; (c) generate multiple mid level sub-trees, wherein each of the mid level sub-trees includes link to at least one of the low level sub-trees; (d) generate a top level sub-tree that includes multiple section links, wherein each of the section links links to one of the mid level sub-trees; (e) create metadata descriptive of at least one of the sub-trees generated, wherein the metadata includes data which is not included in the source document; and (f) generate a structured document that includes the top level sub-tree, at least some of the mid level sub-trees and at least some of the low level sub-trees, and the metadata.

A data accessing system, the system including: (i) an interface for communicating with a memory module in which a structured document is stored, configured to acquire from the memory module portions of the structured document in response to instructions from a processor; and (ii) the processor, which is configured to: (a) acquire from a top level sub-tree of the structured document, via the interface, a link to a mid level sub-tree of the structured document; (b) acquire from the mid level sub-tree, via the interface, a link to a low level sub-tree of the structured document; and (c) retrieve, via the interface, the object from the low level sub-tree; wherein the processor is further configured to compare search query data with metadata which pertains to the content of multiple sub-trees, and which is included in at least one of the sub-trees, and to acquire at least one of the links in response to a result of the comparison.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 illustrates a method for updating of structure documents, according to an embodiment of the invention;

Figure 1:
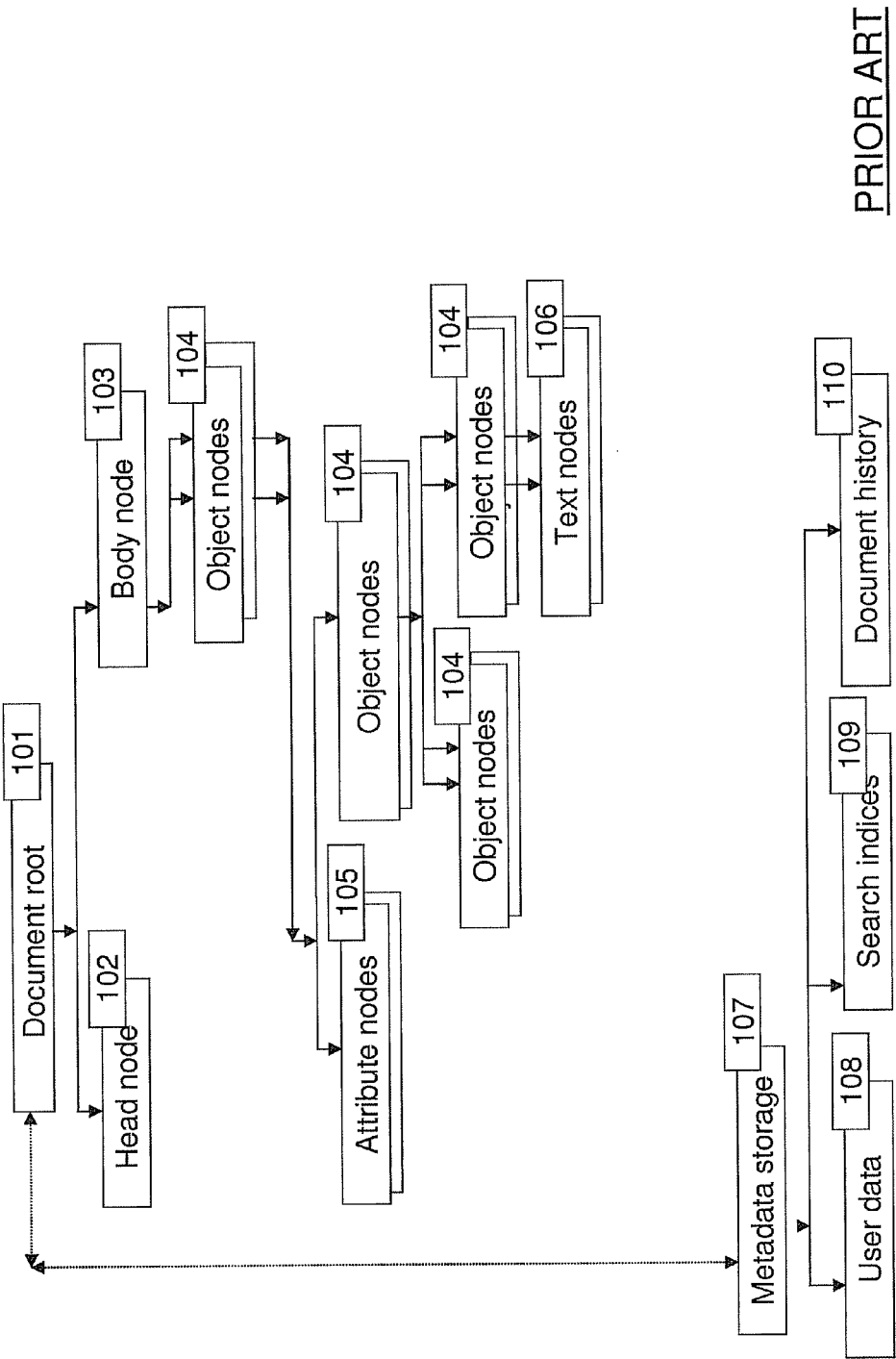
FIG. 1 illustrates a prior art design of a document tree representation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The embodiments described herein are illustrative and non-limiting. Definitions are provided solely to assist one of ordinary skills in the art to better understand these illustrative, non-limiting embodiments. As such, these definitions should not be used to limit the scope of the claims more narrowly that the plain and ordinary meaning of the terms recited in the claims. With that caveat, the following definitions are used:

a. "Browser" means an Internet browser capable of displaying formatted content such as, by way of illustration, HTML, WML, flash and proprietary XML, and scripts formats.

b. "Browsing experience" means a user subjective experience when using the browser. The term includes, by way of illustration, web navigation, browsing history, bookmarks, security, and automation. Examples of automation, by way of illustration, include single sign on and macros.

c. "Browsing history" means content that the user has already accessed by the browser, and which may be available for re-visiting in the future.

d. "Client" is a computational facility that enables a browser and the browser's graphical capabilities.

e. "Computational facility" is a computer, embedded processor, co-processor, computer network or other device capable of digital signal processing and digital communication.

f. "Computer language" is a protocol or format used within a computational facility or between computational facilities, including, by way of illustration, programming languages (such as Java), markup languages (such as DHTML), and communication protocols (such as HTTP).

g. "Device" means a machine employing one or more digital processing units. The term includes, by way of illustration, a personal computer, a cellular phone, a PDA, an IPTV, a Play-station, and other devices employing digital processing units.

h. "Hosted service" means a service operated by a dedicated authority, in which said authority operates as a proxy to provide the service to all relevant customers. Examples of dedicated authorities include, by way of illustration, Internet service providers for personal PCs, cellular operators for mobile devices, and IPTV operators for IPTV-based internet access.

i. "HTML" means an embodiment of formatted content adjusted for display in a browser, including, by way of illustration, HTML, WML, flash and proprietary XML, and scripts formats.

j. "Local device" means a device, for which the user has full administrative rights or has administrative rights related to the devices of other people, including, by way of illustration, personal home computer, personal mobile phone and personal pocket computer.

k. "National language" is a human language, which would include, by way of illustration, English, Chinese, and Hebrew.

l. "Network" means an accessing electrical-mechanical communication network, including, by way of illustration, an Internet network (which may be accessed via the World Wide Web or via other means), other public networks, and private networks. Any such networks may be any level of security from none to the highest possible level. Any such networks may cover any geographic area (such as LAN or WAN), with any number or kind of devices on the network. Any such networks may be one-way in either direction (that is, from network center to remote device, or vice versa), or may be two-way. Any such networks may include various computational facilities. Examples of a "network" include an IPTV network, a TV broadcast network, a mobile telephony network, and a network of security cameras.

m. "Object" media means rich media formats, including, by way of illustration, images, audio, video, synthetic graphics, and flash.

n. "Plug-in" means a browser plug-in, which is software provided by third party to a browser in order to increase the functional capabilities of the browser.

o. "Proxy" means a computational facility that stores and/or modifies the content from the server to be used in the browser.

p. "Server" means a computational facility that stores formatted content.

q. "Structured document" means structured or semi-structured document, including by way of illustration XML, HTML, PDF, Flash, Word, PowerPoint, and other suitable formats.

r. "User" means a human or a computer using the browser.

s. "Web" means a system of interlinked web pages accessed via a network, including, by way of illustration, the World Wide Web over the Internet network.

t. "Web navigation" means various operations required to access specific content. Such operations include, by way of illustration, feeding-in an IP-address, feeding-in a server name, using bookmarks, using forward and backward navigation in browsing history, and using the "home button" on the browser.

u. "Web page" means an object or document available in the web, including, by way of illustration, HTML documents, RSS feeds, RDF data, Flash objects, video streams, and music streams.

v. "XML document" means a document stored in XML format or XML-related formats, including HTML, binary XML, CSS, SOAP, or other suitable document formats.

w. "XML tree" means a tree data-structure characteristic for XML document, including DOM models, binary tree, radix tree or other suitable data structures.

According to various embodiments of the invention, systems, methods and computer program products for multi-resolution structured document representation that enables enhanced contextual search, marking, storage, and user notification, are disclosed. A structured document of interest may be segmented into sections, which in turn may be segmented into fragments via dedicated segmentation algorithms. The sections and fragments of the structured document may be associated with metadata, including overlay layers, search indices, notification events, cross-reference processing, user data and document history. The duplicate sections may be removed based on reference count, resulting in efficient storage. Search-within-search application enables search of fragments and sections inside the documents of interest. Contextual marking application enables marking, tagging and annotation of the fragments of interest. Notification application enables user notification upon changes in section of interest.

According to an embodiment of the invention a structured document is generated in response to source document and each of these documents can include information relating to a physical object, information retrieved from sensors such as but not limited to information relating to a human body.

Disclosed is an alternative and superior method for improving search results management, including context-based search, marking, notification, storage, updates, transcoding, streaming and other suitable applications. Disclosed is includes multi-resolution representation of structured document tree via multiple sub-trees. The multi-resolution representation of document tree may include several levels of detail:

a. Top-level document sub-tree may include document structure, pointers to sections, section versions, search indices, document metadata or other suitable information.

b. Mid-level document sub-trees may include document sections, section metadata, objects, pointers to low-level trees or other suitable information.

c. Low-level document sub-trees may include objects, text nodes, overlay data or other suitable information.

In some embodiments, the multi-resolution may be implemented on one document tree by assigning dedicated tags and attributes for nodes at different levels of the tree, including sections and fragments.

In some embodiments, the sections and fragments may be detected based on amount of words, links and objects in various structures of the document. In some embodiments, the metrics may include font size and color, size on screen, location on screen and other suitable metrics for estimating visual impact.

In some embodiments, the sections and fragments may be assigned with unique names calculated from checksum and preserved by document updates. In some embodiments, the unique attributes of the sections and fragments may be used for referencing and commenting the document.

In some embodiments, a structured changelog may represent the history of changes in the document during its history. In some embodiments, a structured changelog may include only modified sections and fragments with modification dates, checksums and modified content. In some embodiments, the changelog may be created via comparison of the node checksums.

The multi-resolution representation and indexing of structured document tree enables efficient contextual operations, such as search, since an operation may be efficiently localized to specific sub-trees, rather than the whole document. For example, an operation on text may be executed only on fragments that include text. In some embodiments, the information of locality of computation results in fragment or section may replace the information of distance between results, such as number of characters between results.

The multi-resolution representation of document paths enabling shorter paths and faster navigation. For example, the navigation between document nodes may include not only relationship between nodes, but also relationships between sub-trees, such as first node of next sub-tree. Naming of key nodes via unique attributes and tags may facilitate navigation, marking, updating and interactive modification (for example, via streaming or AJAX) of the content of these named nodes. In some embodiments, the naming of the nodes may be performed automatically based on checksum of the node content. Without multi-resolution analysis of the document, the naming may be applied per each document node and the amount of the naming content may become too large for practical usage.

The multi-resolution representation of the document may facilitate selective document update. For example, checksum may be allocated for each significant document node, and the comparison of documents may be performed via comparison of checksums hierarchically from top-level nodes to bottom-level nodes of the content that is not equal between the documents. In some embodiments, the checksum may be calculated bottom-up from document fragments to document sections.

The multi-resolution representation of structured document may be achieved via several complex and dedicated algorithms, including structural and functional analysis of the document, document updates, document layout or other suitable features. The analysis of the document may be performed incrementally, while the document may be uploaded and/or modified.

The applications utilizing the multi-resolution representation of document tree may use dedicated optimization and modifications enabled by multi-resolution representation of document tree. The present invention includes several examples of how applications may use multi-resolution representation of document tree for reduction of resource consumption including storage, computational complexity, programming time and other suitable resources.

Some characteristics of the herein disclosed systems, methods, and computer program products herein disclosed may solve the deficiencies and limitations previously described. Some of these characteristics include the following:

a. Contextual statistics and search capability. Search engines typically utilize indices for words in structured document. By dividing a document into several sub-trees, the statistics and search indices may apply to document sections and paragraphs. Indexing and search within document paragraphs enables section/paragraph search within document search results, search and user navigation between document sections, ranking of specific document sections, contextual advertising per document section and other suitable applications.

b. Efficient contextual marking. User talkbacks, tagging, annotation, document marking or other suitable marking operations may be limited to scope of specific document sections and paragraphs. Unique index for each document section and paragraph may provide a reference for the contextual marking and tagging. The contextual marking overlay may be stored within the context of the relevant sub-tree or associated with the relevant sub-tree namespace. The graphical interface of contextual marking may be related to low-level trees or mid-level trees.

c. Efficient version control and change notification. Document updates and modifications may be limited to some sub-trees. For example, the content sites may feature talkbacks that may be frequently updated. For example, in blogs and directories new entries may be added and old entries may be positioned differently inside the document. Multi-resolution representation of document tree enables incremental modifications and separate version control of each sub-tree, with modification storage per subtree. The user may request notification upon changes in the document. Multi-resolution representation of document tree enables efficient notification upon changes in the document sub-trees selected by the user, including specific document sections and paragraphs.

d. Efficient storage and navigation. Multi-resolution representation of document tree enables shorter paths for navigation between the tree elements, since the navigation between tree elements may be performed on several levels. Large amounts of data on the web is duplicated, including quotations and copying between sites, local changes made by users and web-site owners and updates of document. Multi-resolution representation of document tree enables granular storage, so that various users may reference separate versions of sub-trees and minimal amount of information is stored. Moreover, keeping checksums of document objects, enables cross-referencing of documents for detection of copied information.

e. Simpler programming. The presented multi-level tree representation enables object-oriented programming of tree operations. Each sub-tree may hold event handlers and attributes not available in the original document. There may be polymorphism of sub-tree event handlers, based on sub-tree attributes. The operation on sub-trees and between sub-trees may be uniquely defined, when exact structure of the inner object of sub-tree may vary. In some embodiments, there may be a mapping and/or inverse mapping of sub-trees into programming language classes.

f. Simpler transcoding. In some embodiments of this invention, the multi-resolution analysis supplies the outline of the document and reasonable atomic content units, which may be used for mini-pages.

It will be appreciated by one expert in the art that similar designs may be used for suitable structure documents, including SOAP, binary-XML, CSS, or other suitable formats over databases, mobile browsers, IPTV browsers, and other applications and networks. For example, in the detail description below we provide specific details and notation of the Internet embodiment with HTML pages are presented below.

Figure 2:
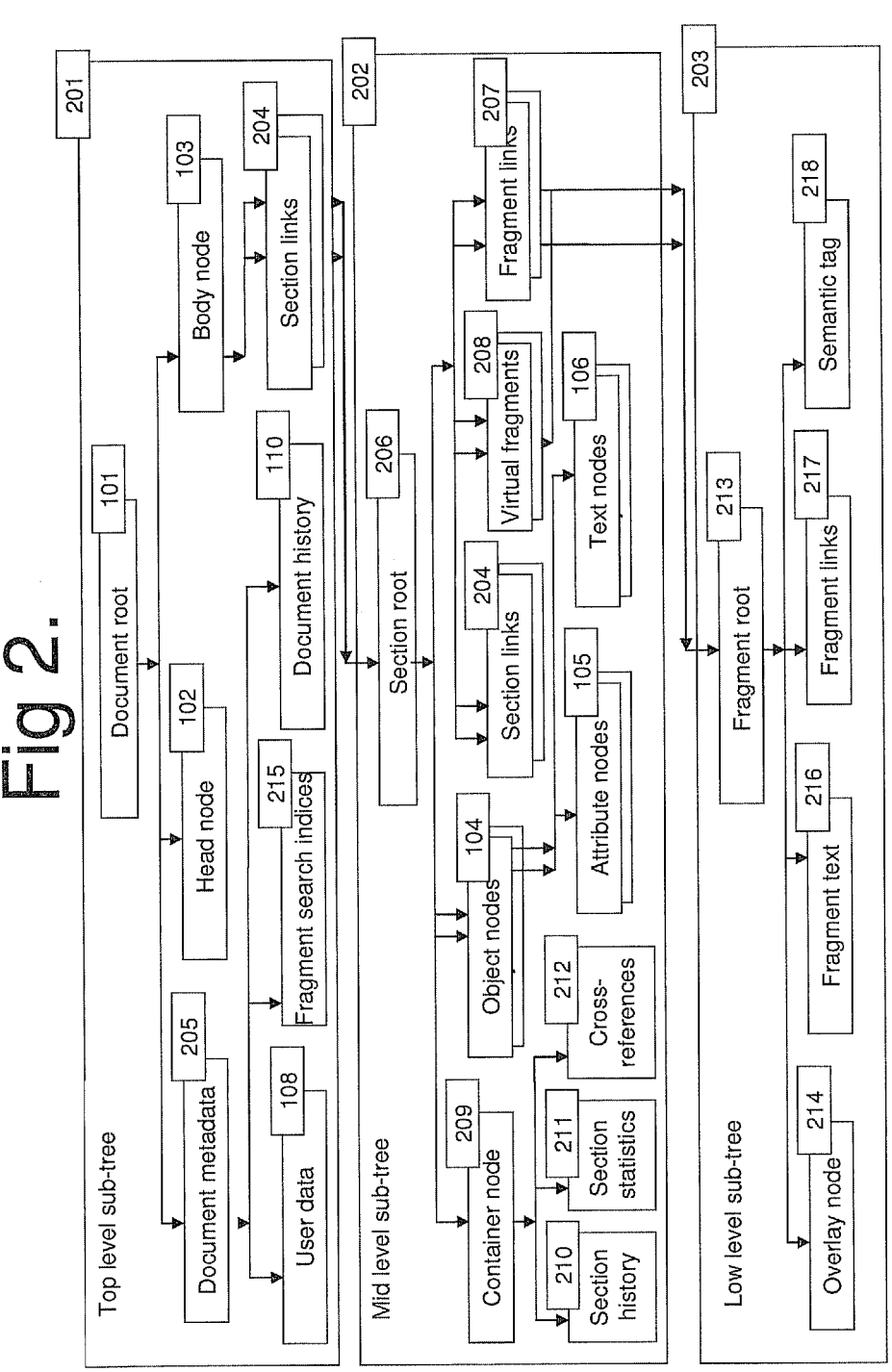
FIG. 2 illustrates a structured document, according to an embodiment of the invention.

FIG. 2 illustrates a structured document, according to an embodiment of the invention. FIG. 2 may be regarded as a document tree representation system. It is noted that the structured document of FIG. 2, as well as other structured documents, may be implemented using XML or other markup languages, which may be dedicated or adapted to the herein disclosed structured documents, but not necessarily so.

Block 201: The top-level sub-tree 201 may contain document structure and metadata. Typically there may be one top-level sub-tree for the document. The top-level sub-tree 201 may contain links to mid-level trees 202 or metadata structures as leaves.

Block 201 element 204: Section links or links to mid-level trees. The document body may consist of several objects, including document header, advertisement banner, document footer, content sections, and other suitable objects. Document sections may appear in various levels of object hierarchy, which may require dedicated algorithms 405 for segmentation of document into sections. Each section link may be associated with path to the document root, and links to section replicas. In some embodiments, multiple replicas of the section are used, according to mirror sites, section modification with time, personal adaptations or other suitable features. In some embodiments, section links to single section may appear in different documents, due to copying of the information between sites. In some embodiments, various section replicas are associated with reference count and last access date, and mirrored, compressed or deleted according to maintenance policy.

Block 201 element 205: Document metadata. Unlike metadata storage 107, document metadata may contain information specific to sub-trees of a given document. In some embodiments, document metadata from several documents may be easily combined into common metadata. In some embodiments, document metadata contains links to replicas of sections and named nodes. For example, if a sentence was added in a second version of talkbacks section, its text will be referenced in A-Z book 109 only for the second version of the section. The metadata 109, 110, 111 may treat each replica of sub-tree as a separate document on FIG. 1. In some embodiments, the document metadata 205 may be stored outside the document context, enabling usage of relational databases and other suitable data containers.

Block 201 element 215: Fragment search indices. Search indices for fragment data, including fragment text, reference links, semantic metadata, or other suitable attribute.

Block 202: A mid-level sub-tree 202 may contain document section tree nodes and keep links to other mid-level sub-trees 202 or low-level sub-trees 203 as leaves. Typically there may be several mid-level sub-trees for an XML document. Mid-level sub-trees 202 may represent document sections, large images, large tables, or other suitable document structures.

Block 202 element 206: Section root. Each document section or mid-level sub-tree may hold a root node. The section root node may have a unique name, checksum, reference count, inverse indices to top-level or mid-level section links 204, or other suitable attributes. The paths of the elements inside the mid-level sub-trees may be relative to the section root. The section root may be associated with event handlers for operations. For example, if the content of the section changes in the original document, the user may receive a notification.

Block 202 element 207: Fragment links. A section may consist of one or several fragments, including paragraphs, small tables, controls, spaces, and other suitable low-level sub-trees. Fragment links enable navigation to fragments. In some embodiments, there may be multiple replicas of fragment for one fragment link.

Block 202 element 208: Virtual fragments. Sections may appear as atomic objects, including images, long paragraphs, embedded objects. In some embodiments, virtual fragments may be associated with parts of section objects. For example, a table of virtual fragments may be defined over image, enabling addressing of image parts for marking, search, navigation and other suitable operations.

Block 202 element 209: Container node. The section metadata may be placed in container node. In some embodiments the container node content may be kept outside the section sub-tree. The container node may hold tables, function pointers and other suitable elements for common operations on sub-tree.

Block 202 element 210: Section history. The section history may contain links to other replicas of the section, before and after section operations. Section history enables "undo" and "redo" of operations, notification on changes, maintenance of multiple replicas of fragments and other suitable operations.

Block 202 element 211: Section statistics. The section statistics may include section checksum, section ranking by search engine or by users, section cross-referencing, and other suitable section metadata.

Block 202 element 212: Cross-reference list. The cross-reference list may include pointers to hyperlinks to other documents, hyperlinks to other sections within the document, links to embedded images and video or other suitable cross-references. In some embodiments, the hyperlinks may be quickly modified from relative hyperlinks to absolute hyperlinks on the relevant mirror site.

Block 203: A low-level sub-tree 203 may contain text nodes 106, attribute nodes 105, or metadata nodes as leaves. The low-level sub-trees 203 may be the lowest level of sub-trees and it may hold no sub-tree children. The low-level sub-trees may represent specific paragraphs, controls, small images, small tables inside the document or other suitable document structures.

Block 203 element 213: Fragment root. Each document fragment or low-level sub-tree may hold a root node. The fragment root node may have a unique name, checksum, reference count, inverse indices to mid-level fragment links 207, or other suitable attributes. The paths of the elements inside the low-level sub-trees may be relative to the fragment root. The fragment root may be associated with event handlers for operations. For example, the fragment may react on mouse-over operation by the user.

Block 203 element 214: Overlay node. Each fragment may be associated with user marking of specific objects inside the fragment. The overlay node may contain the text, graphics, and objects introduced by the user when marking the fragment. The overlay nodes may be stored separately from the fragment nodes. In some embodiments, the overlay node may affect attribute nodes 105. For example, an object may be modified to "transparent" enabling user markings.

Block 203 element 216: Fragment text. The text included in the fragment, including the text of the fragment w/o the metadata. The fragment text may be used for construction of fragment search indices 215.

Block 203 element 217: Fragment links. The links, cross-references, embedded objects, or other suitable metadata, including metadata after semantic analysis and output of linguistic sub-component decomposition or other suitable processing. For example, an object "can_needs.gif" may yield "cat needs" link information.

Block 203 element 218: Semantic tag, including output of semantic analysis of the fragment. For example a fragment with and object "cat_needs.gif" may be labeled under "animals" category. Semantic tag may help with search indexing, contextual advertising, referral and recommendation engines or other suitable mechanism.

It is noted that the structured documents which are herein disclosed, as well as the methods, systems, computer program products and processes which utilize structured documents which are disclosed, may be extended to structured documents which includes more levels than three (e.g. one or more level of sub-trees additionally to the top level sub-trees, mid level sub-trees, and low level sub-trees). Also, in other embodiments of the invention, fewer than three levels (i.e. two and even one) may be utilized.

It is noted that, according to various embodiments of the invention, the sub-trees of the structure document may conform to types which do not necessarily match the three levels described. For example, according to an embodiment of the invention, only one type (or sort) of sub-tree is being used, with complex hierarchy of the sub-trees, wherein the levels of the sub-trees are defined by relations (which sub-tree includes link to which other sub-tree) and not by type. According to another embodiment of the invention, sub-trees of a first sort may be implemented in two or more different levels, wherein sub-trees of a second sort may also be implemented in the two or more different levels (i.e. even if multiple types of sub-trees are implemented, the different types do not necessarily correspond to the different levels).

The different levels (and/or types) or sub-trees may also correspond, according to various embodiments of the invention, to the type of functionalities that they enable, or which is used for there creation (e.g. algorithms of top-down analysis of top level sub-trees, bottom-up analysis for low level sub-trees, and iterative segmentation/clustering for mid level sub-trees).

According to an embodiment of the invention, all three (or more) forms of processing are merged in a sort of recursive function with stopping criteria when reaching leaves or root node.

While the structured documents and their utilizations are discussed in relation to three levels of sub-trees, it is noted that usually the systems, methods, processes, and computer program products which utilize the structured document may be adapted to handle and use structured documents of different number of levels. Considering, by way of example, system 1200 discussed below; while system 1200 is discussed as implementing structured documents including three levels of sub-trees, it can usually also handle structured document of one or two levels, as well as more levels. For example, if the source document tree has only one node, it usually cannot be divided into three levels of sub-trees (not considering, for example, virtual fragmentation, as discussed below), yet it is very easily utilized in system 1200 and other products disclose.

It is further noted that some structured documents may have nodes which do not conform to clear distinction of layers (e.g. a first leave node may be connected to the root node, while another may be connected via three intermediate layers).

According to various embodiments of the invention, some of which are discussed below, the levels of sub-trees may be differentiated by the various levels of metadata which is used in the different layers.

Figure 3:
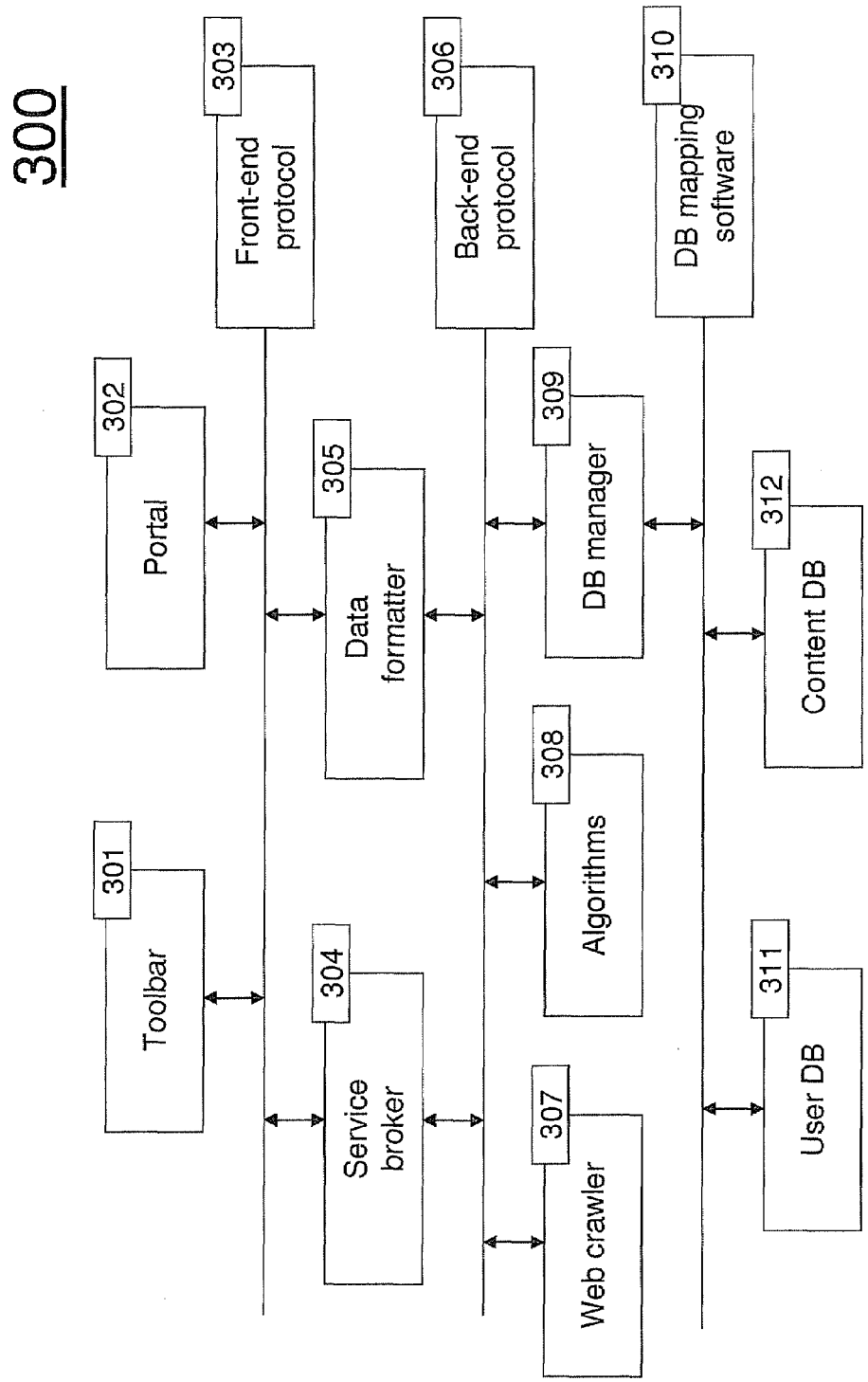
FIG. 3 illustrates a system, according to an embodiment of the invention.

FIG. 3 illustrates a system architecture for applications using the proposed XML tree representation system. It is noted that the system of FIG. 3 may utilize the structured document of FIG. 2, any of the other variations of structured documents herein disclosed, or similar structured documents.

The toolbar 301 enables user to execute search, marking, navigation, and other suitable operations over any web document.

The portal 302 enables user with an access point to previous searches, markings and other suitable operations, enables communication between users, and enables display of cached content. The portal 302 may also provide software for toolbar installation, landing pages for search engines and other suitable web services.

The front-end protocol 303, such as AJAX or Flash, enables communication between client-side display/actions and server-side processing. The unique identifiers for section and fragment root elements facilitate the communication protocol.

The service broker 304 enables load balancing, parallel processing, pipeline processing, and dynamic allocation of web services.

The data formatter 305 reformats the data between various web services and client-side applications.

The back-end protocol 306, such as SOAP, enables communication between various web services.

The web-crawler 307 enables access to various web-sites, web-site updates, caching and indexing.

The algorithms 308 enable dedicated processing required for applications.

DB (database) manager 309 enables access to various stored documents, sub-trees, tables and other suitable data.

DB mapping software 310, such as Hybernate™, provides mapping between databases and classes in DB manager 309.

User DB 311 holds information specific to user, including user profile, user operations, content portfolio of a user and other relevant information.

Content DB 312 holds information specific to content, including sub-trees, metadata, and other relevant information.

Figure 4A:
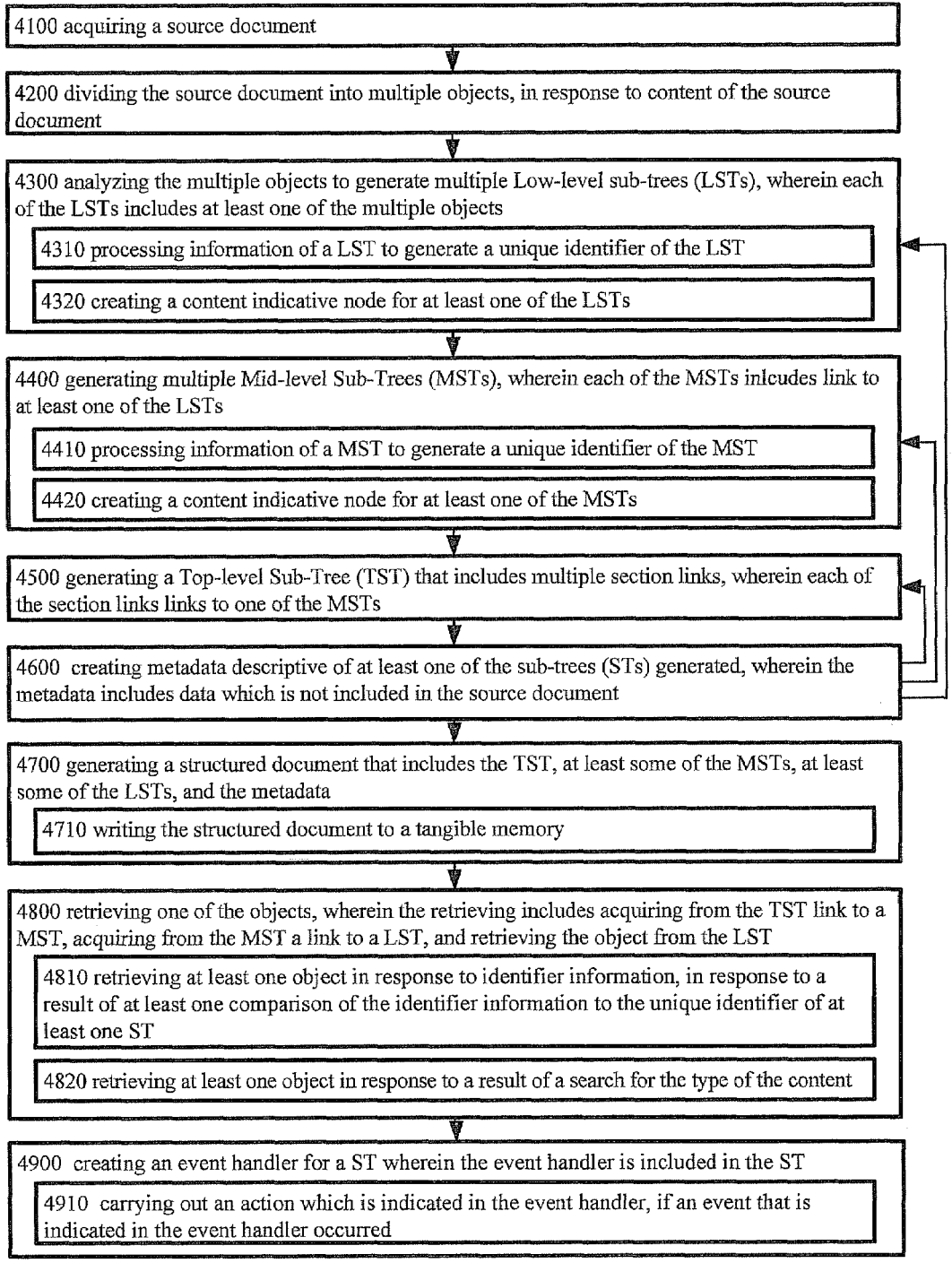
FIG. 4A illustrates a system for improving data accessibility, according to an embodiment of the invention.

FIG. 4A illustrates method 4000 for improving data accessibility, according to an embodiment of the invention. According to an embodiment of the invention, method 4000 may be implemented by system 1200, and/or by system 300 of FIG. 3.

It is noted that in various embodiments of the invention, one or more stages of the other methods and processes discussed in the disclosure may be incorporated into system 4000, even if not explicitly elaborated.

Method 4000 may start with stage 4100 of acquiring a source document. It is noted that the source document may be a structured source document (e.g. an XML document), but this is not necessarily so. The source document may be acquired in different ways, according to different embodiments of the invention. For example, the source document may be acquired by a web-crawler, e.g. when improving accessibility to many internet document is required, it may be acquired in response to user selection, it may be required in response to a result of a search or a query, and so forth. It is noted that method 4000 may be carried out for multiple source document (some of which may depend on each other, but not necessarily so, e.g. as discussed below), wherein the following steps of method 4000, when carried out for a first source document, may depend on the outcomes of the processing of a second source document according to method 4000, but this is not necessarily so.

Stage 4200 of method 4000 includes dividing the source document into multiple objects, in response to content of the source document. It is noted that stage 4200 may correspond to stage 402 of method 400, but this is not necessarily so. Stage 4200 may include dividing the source document into sections or smaller objects, based on decision rules and on features of parts of the source document. According to an embodiment of the invention, the dividing is carried out in a recursive manner, wherein parts of a first division may be further divided in a second division, until a stopping criteria is reached.

According to an embodiment of the invention, the dividing may be responsive to a spatial layout of the source document, to document tree paths and node attributes, to strings included inside the document text, or other features in any suitable document representation.

According to an embodiment of the invention, the dividing may start with identifying (or finding) large objects (e.g. frames, forms, flash, images). Spatially large objects may form document sections with virtual fragments. Objects capable of holding sub-trees, such as forms and frames, may consist of multiple fragments.

According to an embodiment of the invention, the dividing may include detecting repeating objects (e.g. pattern, template, class, table). Periodic and semi-periodic objects, such as tables, may be divided into fragments, such as a fragment per cell. Sections in blog may hold specific templates, including by way of illustration widget class and social tagging buttons at section footer and header.

According to an embodiment of the invention, the dividing may include identifying compact distribution (e.g. spatial, updates, path lengths). By detection and merging objects at some spatial grid, spatially compact sections may be determined. Proximate objects may be grouped together, wherein the proximity may be determined using different metrics, e.g. distance (on screen or otherwise), similarity, color, etc. A document update of compact size may indicate insertion or deletion of document section. A node path appearing in many objects may indicate that the objects belong to a section.

Other suitable segmentation algorithms may be used in the dividing. For example, several pages on a content site may share header and control structures, but have different articles within, so the segmentation may be performed by comparing several pages of one site.

It is noted that, according to an embodiment of the invention, full document segmentation may be computationally expensive and may be executed based on predefined policy, for example:

a. Serving clients with premium quality of service, including transcoding to multiple devices, that may rely on sub-tree decomposition for the services. The sections may be determined via layout simulation for various scenarios.

b. Prioritizing multiple documents from the content provider exist on the database. Pages of the same content provider may share structural elements, and sections may be determined by document comparison.

c. Multiple updates of a web page. Web pages may have static parts and dynamic parts, which enables sub-tree decomposition based on changes in the web page.

d. Multiple users of a web page. Web pages may have multiple markings by multiple users. Analysis of the markings and their location may enable sub-tree decomposition.

It is noted that, according to an embodiment of the invention, the dividing may be preceded by analyzing content of the source document to determine effectiveness of structuring the source document, wherein the dividing may be selectively carried out in response to a result of the determining.

According to an embodiment of the invention, if the full document dividing is not performed, the body of the document may appear as a single section, with multiple fragments attached to it. The head of the document may also appear as a section, for purposes of cross-referencing, SEO, and other suitable applications. It is further noted that, according to an embodiment of the invention, the dividing may include dividing of a previously divided document (e.g. providing more profound dividing, or modifying the division), for example when the source document updates or when multiple users are using the source document.

Stage 4300 of method 4000 includes analyzing the multiple objects to generate multiple low level sub-trees, wherein each of the low level sub-trees includes at least one of the multiple objects (which resulted from the dividing of stage 4200). Stage 4300 may correspond to stage 403 of method 400, but this is not necessarily so. It is noted that one or more of the low level sub-trees generated in stage 4300 may be similar to low level sub-tree 203 illustrated in FIG. 2, but this is not necessarily so.

It is noted that a low level sub-tree may correspond to a fragment of the source document, storing (or pointing to) a fragment text (e.g. a paragraph, a sentence), a table cells (or row/column), an image, or a fragment of an image, and so forth. Stage 4300 may include generating a group of low level sub-trees which between them exhaust (or cover) all the content of the source document, but this is not necessarily so. Also, one or more of the low level sub-trees (and potentially even all of them) may not include the object (or objects), but rather link to a storing location of the object.

It is noted that the generating of stage 4300 may further include generating of low level sub-trees for storing of data that is not included in the source document, such as metadata, user comments, search related information, and so forth. Furthermore, the generating of stage 4300 may include generating of virtual-fragment low level sub-trees, which do not correspond to full objects, but to portion of which. For example, if a large image was rendered as a single object during stage 4200, it may still be desirable to have several virtual-fragment segmentation of which, e.g. for enabling users to comment on different portions of the image. Therefore, a first low level sub-tree may include the image (or refer to it), while other virtual low level sub-trees may include references to overlay information that pertains to different areas of the image. Virtual objects may also include spaces.

According to an embodiment of the invention, stage 4300 may include generating of low level sub-trees that includes the at least one object, as well as one or more of the following: one or more overlay nodes, one or more fragment links, one or more semantic tags, one or more fragment search index, a fragment header.

According to an embodiment of the invention, the generating may include creating for a low level sub-tree an inverse link to a higher-level sub-tree (either a mid level sub-tree or a top level sub-tree), and incorporating the inverse link as a node of the sub-tree. According to an embodiment of the invention, the generating may include creating for a low level sub-tree a link to another low-level sub-tree (e.g. storing alternative versions of the content, user remarks pertaining to the object, and so forth), and incorporating that link as a node of the sub-tree. According to an embodiment of the invention, the generating may include creating for a low level sub-tree a link to sub-tree of another document.

According to an embodiment of the invention, the links, cross-references, embedded objects, or other suitable metadata, including metadata after semantic analysis and output of linguistic sub-component decomposition or other suitable processing may be included in the low level sub-tree.

It is noted that the incorporation of links into low level sub-trees (and generally, to higher level sub-trees as well) may be carried out not during the original generating but afterwards, e.g. after completion of generation of the structured document, during maintenance, after updating of the document, and so forth.

According to an embodiment of the invention, each fragment may be associated with user marking of specific objects inside the fragment. The overlay node may contain the text, graphics, and objects introduced by one or more user when marking the fragment. The overlay nodes may be stored separately from the fragment nodes. In some embodiments, the overlay node may affect attribute nodes (e.g. of a mid level sub-tree that links to the low level sub-tree). For example, an object may be modified to "transparent" enabling user markings.

According to an embodiment of the invention, method 4000 may include incorporating (and possibly selecting in response to the content) into a low level sub-tree a semantic tag, e.g. including output of semantic analysis of the fragment. For example a fragment with and object "cat_needs-.gif" may be labeled under "animals" category. Semantic tag may help with search indexing, contextual advertising, referral and recommendation engines or other suitable mechanism. The incorporation of the semantic tag may be carried out during stage 4300, or afterwards.

In different embodiments, some types of such nodes may be compulsory (e.g. fragment root), while other may be optional (e.g. semantic tag). While other types of nodes may be included in low level sub-trees, every combinations of the aforementioned discussed types of nodes may be compulsory, in various embodiments of the invention.

Stage 4400 of method 4000 includes generating multiple mid level sub-trees, wherein each of the mid level sub-trees includes link to at least one of the low level sub-trees. According to an embodiment of the invention, one or more of the mid level sub-trees generated in stage 4400 is similar to mid level sub-tree 202 of FIG. 2, but this is not necessarily so.

It is noted that a mid level sub-tree may correspond to a larger section of the source document, e.g. a text section (e.g. a page, a section), a table (or row/column), an image, flash item, video, and so forth. Stage 4400 may include generating a group of mid level sub-trees which between them exhaust (or cover) all the content of the source document, but this is not necessarily so. Also, one or more of the mid level sub-trees include links to one or more (and potentially just) virtual-objects low level sub-trees.

It is noted that the generating of stage 4400 may further include generating of mid level sub-trees for referring to data that is not included in the source document, such as metadata, user comments, search related information, and so forth.

According to an embodiment of the invention, stage 4400 may include generating of mid level sub-trees that includes the at least one link to one or more low level sub-trees, as well as one or more of the following: a root node (which may have, for example, a unique name, checksum, reference count, inverse indices to top-level or mid-level section links 204, event handlers, and so forth); one or more container node (which may include or link to section metadata, e.g. tables, function pointers and other suitable elements for common operations on sub-tree), section history (e.g. links to other replicas of the section, before and after section operations), section statistics (e.g. section checksum, section ranking by search engine or by users, section cross-referencing, and so on), cross-reference list (which may include pointers to hyperlinks to other documents, hyperlinks to other sections within the document, links to embedded images and video or other suitable cross-references), one or more semantic tags, and so on.

According to an embodiment of the invention, the generating of stage 4400 may include creating for a mid level sub-tree an inverse link to a top-level sub-tree (usually one that links to the mid level sub-tree), and incorporating the inverse link as a node of the sub-tree. According to an embodiment of the invention, the generating may include creating for a mid level sub-tree a link to another mid-level sub-tree (e.g. storing alternative versions of the content, user remarks pertaining to the object, links to following/previous page, and so forth), and incorporating that link as a node of the sub-tree. According to an embodiment of the invention, the generating may include creating for a mid level sub-tree a link to sub-tree of another document.

According to an embodiment of the invention, the links, cross-references, embedded objects, or other suitable metadata, including metadata after semantic analysis and output of linguistic sub-component decomposition or other suitable processing may be included in the mid level sub-tree.

It is noted that the incorporation of links into mid level sub-trees may be carried out not during the original generating but afterwards, e.g. after completion of generation of the structured document, during maintenance, after updating of the document, and so forth.

According to an embodiment of the invention, method 4000 may include incorporating (and possibly selecting in response to the content) into a mid level sub-tree a semantic tag, e.g. including output of semantic analysis of the fragment. The incorporation of the semantic tag may be carried out during stage 4400, or afterwards.

It should be noted that semantic tags of sub-trees may be used in different ways, e.g. for enhancing searching capabilities, and so forth. For example, one such method which utilizes semantic tags includes the following stages:

A. Creating a semantic tag cloud (e.g. a tag cloud of multiple semantic tags) for a sub-tree;

B. Creating a semantic tag cloud of at least a portion of the structured document which excludes the sub-tree (e.g. may also be of a higher one or more sub-trees, excluding the sub-tree of stage A);

C. Processing the two aforementioned tag clouds, for determining a tag cloud of semantic tags which are unique to the sub-tree (or at least substantially unique for the sub-tree, wherein the distinctiveness of the semantic tags may depend on different metrics such as distance between tags). This may be used for creating metadata in response to a result of a comparison between the tag clouds. Such a tag cloud of unique semantic tags may be used, for example, for:

a. generating a tagname,
    b. generating a related querie,
    c. writing other metadata,
    d. comparing sub-trees.
    e. writing report,
    f. and so forth.

It should be noted that such utilization of semantic tags is not exclusive to method 4000, and may be implemented in the other methods, processes, systems, and computer program products disclosed herein.

In different embodiments, some types of such nodes may be compulsory (e.g. section root), while other may be optional (e.g. semantic tag). While other types of nodes may be included in mid level sub-trees, every combinations of the aforementioned discussed types of nodes may be compulsory, in various embodiments of the invention.

It is noted that stage 4400 may include generating a mid level sub-tree that includes links to smaller mid level sub-trees, either on top or instead of links to low level sub-trees. That is, according to an embodiment of the invention, more than three level of trees may be used. it is noted that different levels may be associated with different characteristics, operations, and so forth—but this is not necessarily so.

According to an embodiment of the invention, stage 4400 may include determining paths of fragments and smaller sections 204 relative to section root 206, and possibly also adding the paths as: a fragment identifiers to a fragment roots of low level sub-trees linked to by the mid level sub-tree; (b) fragment attributes nodes, and/or (c) fragment link nodes. In some embodiments, the fragment identifier path facilitates matching of sub-tree elements and reconstruction of the document tree from document sub-trees.

According to an embodiment of the invention, method 4000 may include managing section history (also referred to as mid level sub-tree history), either during stage 4400, or afterwards. In some embodiments, the section may hold references to multiple versions of fragments. In some embodiments, the section may be created by segmentation from a larger existing section. In some embodiments, the section may differ between various users. The modifications of the section may require version management, processing of section history and document history, and conflict resolution.

According to an embodiment of the invention, method 4000 may include managing entering into one or more mid level sub-trees section statistics (either during stage 4400, or afterwards). A section may be associated with statistics, including section ranking, user voting, section size, cross-reference number and other suitable statistics. Section statistics may be inferred from multiple documents based on one section, section segmented from larger section, section updated from existing section, or other suitable section operations.

Stage 4500 of method 4000 includes generating a top level sub-tree that includes multiple section links, wherein each of the section links links to one of the mid level sub-trees. Conveniently, only a single top level sub-tree is generated for a structured document (albeit in some situations more than one top level sub-trees may be generated—e.g., a current top level sub-tree may link to a previous version top level sub-tree). The top level sub-tree may be similar to top level sub-tree 201 of FIG. 2, but this is not necessarily so. According to an embodiment of the invention, the generating of stage 4500 may correspond to stage 405 of method 400, but this is not necessarily so.

On top of the section links, the top level sub-tree generated may further include one or more of the following: document root, body node (which may include the section links), head node, document metadata node, user data, fragment and/or sections search indices, document history, and so forth.

According to an embodiment of the invention, stage 4500 may include calculating paths of sections, relative to the document root. The section paths facilitate recombination of the full document from multiple sections. If many sections share similar paths or section paths are very long, intermediate sections may be created to facilitate navigation within document.

According to an embodiment of the invention, stage 4500 may include incorporating into the top level sub-tree data that is not include in the source document, or in any one or the lower level sub-trees linked to from the top level sub-tree. It is noted that the top level sub-tree—and different nodes of which—may be updated once or more, e.g. when actions are taken over the structured document.

According to an embodiment of the invention, method 4000 may further include stage 4600 of creating metadata descriptive of at least one of the sub-trees generated, wherein the metadata includes data which is not included in the source document. Such metadata may be written to any of the sub-trees generated in the previous stages (and possibly also to other sub-trees, e.g. of other documents; e.g. if a low level sub-tree of another structured document was linked to, it may be indicated in that other structured document). It is noted that the creating (and writing) of such metadata may be carried out also after a creation of the structured document.

It is noted that the metadata created may include different types of information, according to various embodiments of the invention, as well as be used for different functionalities. For example, according to an embodiment of the invention, the metadata may be used for retrieval of parts of the document. According to an embodiment of the invention, the metadata may be used for implementing a "goto" functionality, which enables "jumping" to at least one object of interest in the browser for display. According to an embodiment of the invention, metadata may be utilized for indexing, for inserting and/or for updating data at an index position.

According to an embodiment of the invention, the creating of the metadata for a sub-tree may include generating statistics for the sub-tree. For example, such meta data may be used for searching within the structured document, wherein the creating of the metadata may include saving a record of the number of time a word is found within each lower-level sub-tree, which is propagated to higher level sub-trees, as well as possibly saving a record of the size of the sub-trees (e.g. number of characters, links etc). This metadata may later be used for finding sub-trees most informative for a query, which may be presented to the user (e.g. within a search-within-search implementation)

Stage 700 of method 4000 includes stage 4700 of generating a structured document that includes the top level sub-tree, at least some of the mid level sub-trees, at least some of the low level sub-trees, and—according to an embodiment of the invention—also the metadata. It is noted that not all of the lower levels sub-trees may be included (e.g. if linking to similar sub-trees of other documents is possible, for example—a paragraph or design which returns in many pages of a website). Stage 4700 may include stage 4710 of writing the structured document to a tangible memory (e.g. an electromagnetic memory unit, a mechanical memory unit, an optical memory unit, a paper memory, and so forth).

It should be noted that while the structured document is generated as a single entity, it is not necessarily stored as one. According to some embodiments of the invention, some or all of the sub-trees (and especially the lower-level trees) may be stored within another documents (whether structured or partly-structured documents), and may even be stored independently, or within a respective non-document structure (e.g. a hash-table), and may be retrieved independently.

Storing of sub-trees separately from other sub-trees (and/or separately from a master structured document) may ease the accessing and/or linking to those sub-trees by other structured document, as disclosed in the corresponding stages.

According to an embodiment of the invention, method 4000 may include creating for a sub-tree selected from a group consisting of the low level sub-trees and the mid level sub-trees an inverse link to a higher-level sub-tree, and incorporating the inverse link as a node of the sub-tree (e.g. as in the above offered examples).

According to an embodiment of the invention, method 4000 may include creating for a sub-tree selected from a group consisting of the low level sub-trees and the mid level sub-trees a reference link to a document, other than the structure document, which links to the sub-tree.

According to an embodiment of the invention, method 4000 may further include stage 4800 of retrieving one of the objects, wherein the retrieving includes acquiring from the top level sub-tree link to a mid level sub-tree, acquiring from the mid level sub-tree a link to a low level sub-tree, and retrieving the object from the low level sub-tree (either if it is stored within the low level sub-tree, or externally to it and linked to by the low level sub-tree).

The retrieving may be carried out in many situations, in some of which the entire structured document should be retrieved, in other only content of the source document (as stored by the structured document) should be retrieved, and in other—only fraction of the content of the structured document should be retrieved (whether it is content of the source document, and/or metadata content added later).

For example, the retrieving may result by a request of a user, by a search engine, by an indexing engine, by a web-crawler, as a result of a query, for maintenance reasons (e.g. copying to another location in the memory), and so forth. The retrieving may also serve for the creating, updating or deletion of another structured document (or another document).

Several techniques may be used for efficient retrieving, according to various embodiments of the invention. According to an embodiment of the invention, method 4000 includes processing information of one of the sub-trees to generate a unique identifier of the sub-tree (denoted 4310, 4410, for stages 4300 and 4400 respectively, and may also be implemented for stage 4500, though for simplicity of the diagram it is not illustrated). It is noted that the generating of the unique identifier may be carried out together with the generation of the respective sub-tree, when it is being updated, or at any other point in time.

According to an embodiment of the invention, the retrieving includes stage 4810 of retrieving at least one object in response to identifier information (which may be retrieved from a higher level sub-tree, or otherwise), wherein the retrieving includes retrieving the object in response to a result of at least one comparison of the identifier information to the unique identifier of at least one sub-tree (which may be stored in that sub-tree, or in a higher level sub-tree).

According to an embodiment of the invention, method 4000 may include other utilizations for such unique identifiers—e.g. determining if content of a sub-tree have changed (e.g. for updating), comparing if content of two sub-trees is identical (e.g. for linking to sub-trees of other documents), and so forth.

According to various embodiments of the invention, different types of unique identifiers may be used. For example, some of the unique identifiers which may be used are fingerprint (also referred to as fingerprint functions), checksums, hash functions, and so forth. It is noted that wherever the term checksum is used in the description of the application, other such types of unique identifiers may also be implemented.

According to an embodiment of the invention, method 400 may include updating at least one sub-tree with updated information, wherein the updating is selectively carried out in response to a result of a comparison of identifier information of the updated information to the unique identifier. e.g. the comparison of documents may be performed via comparison of checksums hierarchically top-bottom or bottom-up, thus enabling not saving redundant information twice, thrice, or more.

According to an embodiment of the invention, method 4000 may further include creating a content indicative node for at least one of the sub-trees selected from a group consisting of the low level sub-trees and the mid level sub-trees, wherein the content indicative node includes information indicative of a type of at least a portion of the content of the sub-tree. (e.g. stage 4320, 4420, and similar stage for stage 4500, which is not illustrated).

According to an embodiment of the invention, the retrieving may further include stage 4820 of retrieving at least one object in response to a result of a search for the type of the content. It is noted that type can be image or text and so forth, but may also be a semantic field (associated with a semantic tag), related to appearance (e.g. size of font, color), related to metadata (e.g. objects commented upon by users), related to attributes (e.g. having specific event handlers), related to semantic segment (e.g. to table of contents, reference notes), and so forth.

This way, for example, a search may concentrate only on text objects, on non-transparent layers, and so forth, improving significantly the time of the search.

Referring to version management, e.g. as discussed above, according to an embodiment of the invention method 4000 may include updating a sub-tree selected from a group consisting of the low level sub-trees and the mid level sub-trees, and updating at least one sub-tree that links to the updated sub-tree, to include links to the updated version of the sub-tree, and to an old version of the sub-tree. It is noted that link to the updated (or older) version of the sub-tree may also be saved in a peer-level sub-tree (e.g. in the replaced sub-tree).

According to an embodiment of the invention, method 4000 may include stage 4900 of creating an event handler for a sub-tree (a low level sub-tree, a mid level sub-tree, or a top level sub-tree), wherein the event handler is included in the sub-tree, wherein the method further stage 4910 of carrying out an action which is indicated in the event handler, if an event that is indicated in the event handler occurred.

For example, the event handler may include an instruction to notify a user or to update a log if an update was made to a document (or a section/fragment of which), if a comment was added by a specific user, if not action applied to the document/section/fragment for a certain period of time, and so forth.

According to an embodiment of the invention, method 4000 further includes receiving (from a user or an intermediary system/unit) user selection information indicative of a selection of one or more of the objects, and updating at least one sub-tree which refers to at least one of the selected object in response to the information received from the user. Conveniently, the updating is preceded identifying the one or more selected objects in response to the selection information (e.g. click location) and to metadata of one or more of the sub-trees.

According to an embodiment of the invention, method 4000 further includes analyzing, before at least one of the stages of generating, content of the source document to determine effectiveness of structuring the source document, wherein the at least one stage of generating is selectively carried out in response to a result of the determining.

Referring to method 4000 in general, creating, storing, and using structured documents may facilitate different utilizations, some of which are discussed below.

Contextual statistics and search capability. Search engines typically utilize indices for words in structured document. Following the dividing, and at least some of the stages of generating, method 4000 may further include writing into one or more of the sub-trees statistics and search indices that may apply to document sections/fragments. Indexing and search within document paragraphs (or other low level sub-trees/mid level sub-trees) may enable section/paragraph search within document search results, search and user navigation between document sections, ranking of specific document sections, contextual advertising per document section and other suitable applications.

Efficient contextual marking. User talkbacks, tagging, annotation, document marking or other suitable marking operations may be limited to scope of specific document sections and paragraphs. Unique index for each document section and paragraph may provide a reference for the contextual marking and tagging. The contextual marking overlay may be stored within the context of the relevant sub-tree or associated with the relevant sub-tree namespace. The graphical interface of contextual marking may be related to low-level trees or mid-level trees.

Efficient version control and change notification. Document updates and modifications may be limited to some sub-trees. For example, the content sites may feature talkbacks that may be frequently updated. For example, in blogs and directories new entries may be added and old entries may be positioned differently inside the document. Multi-resolution representation of document tree enables incremental modifications and separate version control of each sub-tree, with modification storage per sub-tree. The user may request notification upon changes in the document. Multi-resolution representation of document tree enables efficient notification upon changes in the document sub-trees selected by the user, including specific document sections and paragraphs.

Efficient storage and navigation. Multi-resolution representation of document tree enables shorter paths for navigation between the tree elements, since the navigation between tree elements may be performed on several levels. Large amounts of data on the web is duplicated, including quotations and copying between sites, local changes made by users and web-site owners and updates of document. Multi-resolution representation of document tree enables granular storage, so that various users may reference separate versions of sub-trees and minimal amount of information is stored. Moreover, keeping checksums of document objects, enables cross-referencing of documents for detection of copied information.

It is noted that utilization of granular elements is disclosed in U.S. patent application Ser. No. 12/416,947, filed Apr. 2, 2009 by the same inventor, and which is entitled "Systems, Methods and Computer Program Products for Content Management", that is incorporated herein by reference in its entirety. It is noted that the different systems, methods, processes, and computer program products which are disclosed in the Ser. No. 12/416,947 application in relation to granular elements may be incorporated for the herein disclosed sub-trees (or group of sub-trees), mutatis mutandis, and the that herein disclosed systems, methods, processes, and computer program products may be incorporated for granular elements as discussed in the Ser. No. 12/416,947 application, with necessary changes.

Simpler programming. The presented multi-level tree representation enables object-oriented programming of tree operations. Each sub-tree may hold event handlers and attributes not available in the original document. There may be polymorphism of sub-tree event handlers, based on sub-tree attributes. The operation on sub-trees and between sub-trees may be uniquely defined, when exact structure of the inner object of sub-tree may vary. In some embodiments, there may be a mapping and/or inverse mapping of sub-trees into programming language classes.

Simpler transcoding. According to an embodiment of the invention, method 4000 includes utilizing of the sub-trees structures and reference for generating a table of contents and multiple mini-pages which may be designed for the requirements of a target device. In some embodiments of this invention, the multi-resolution analysis supplies the outline of the document and reasonable atomic content units, which may be used for mini-pages.

Figure 4B:
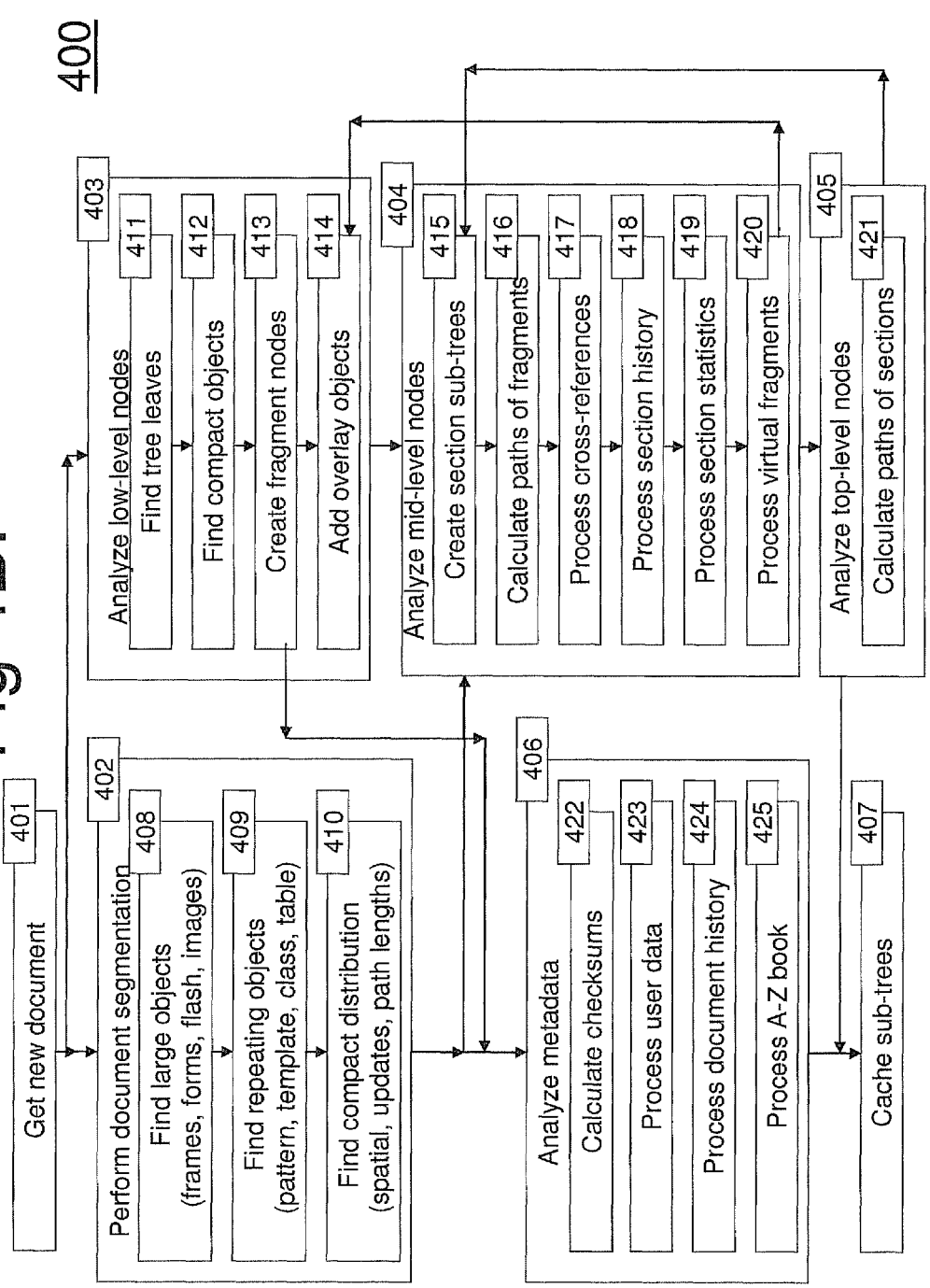
FIG. 4B illustrates a method for generating sub-trees, according to an embodiment of the invention.

FIG. 4B illustrates a method for sub-trees creation method (e.g. of XML sub-trees), according to an embodiment of the invention.

Stage 401: Get new document. Web crawler 307 may fetch a web document based on URL and cookies or other suitable web page identification method.

Stage 402: Perform document segmentation. Divide document into sections based on rules and features. The step may be executed several times, until stopping criteria is reached. The segmentation step may be performed using document's spatial layout, document tree paths and node attributes, strings inside the document text or other features in any suitable document representation.

Stage 402 phase 408: Find large objects (frames, forms, flash, images). Spatially large objects may form document sections with virtual fragments. Objects capable of holding sub-trees, such as forms and frames, may consist of multiple fragments.

Stage 402 phase 409: Find repeating objects (pattern, template, class, table). Periodic and semi-periodic objects, such as tables, may be divided into fragments, such as a fragment per cell. Sections in blog may hold specific templates, including by way of illustration widget class and social tagging buttons at section footer and header.

Stage 402 phase 410: Find compact distribution (spatial, updates, path lengths). By detection and merging objects at some spatial grid, spatially compact sections may be determined. A document update of compact size may indicate insertion or deletion of document section. A node path appearing in many objects may indicate that the objects belong to a section.

Other suitable segmentation algorithms may be used. For example, several pages on a content site may share header and control structures, but have different articles within, so the segmentation may be performed by comparing several pages of one site.

The full document segmentation may be computationally expensive and may be executed based on predefined policy, for example:

a. Rule 1 for document segmentation: Premium quality of service. Clients with premium quality of service, including transcoding to multiple devices, may rely on sub-tree decomposition for the services. The sections may be determined via layout simulation for various scenarios.

b. Rule 2 for document segmentation: Multiple documents from the content provider exist on the database. Pages of the same content provider may share structural elements, and sections may be determined by document comparison.

c. Rule 3 for document segmentation: Multiple updates of a web page. Web pages may have static parts and dynamic parts, which enables sub-tree decomposition based on changes in the web page.

d. Rule 4 for document segmentation: Multiple users of a web page. Web pages may have multiple markings by multiple users. Analysis of the markings and their location may enable sub-tree decomposition.

If the full document segmentation is not performed, the body of the document may appear as a single section, with multiple fragments attached to it. The head of the document may also appear as a section, for purposes of cross-referencing, SEO, and other suitable applications. Moreover, the documents segmentation may be performed incrementally with document updates or multiple users using the document.

Stage 403: Analyze low-level nodes.

Stage 403 phase 411: Find tree leaves, including element attributes, text nodes, and other suitable tree nodes.

Stage 403 phase 412: Find compact objects. Progress from leaves to root, until sufficiently compact and independent object is found. If the compact object is sufficiently small, it may form a fragment. If the detected object is large, it may form a section with virtual fragments. The object may be independent if a span or a layer may be introduced between the object of interest and parent node, without significantly modifying document layout.

Stage 403 phase 413: Create fragment sub-tree. Each compact object may be encapsulated in fragment sub-tree. The fragment inside the section may be replaced by a fragment link to the fragment sub-tree.

Stage 403 phase 414: Add overlay objects. Overlay objects may be added to fragments, enabling user marking and commenting of the fragments. For example, in HTML, fragment position property may be set to relative, and a layer with absolute position may be added to the fragment as overlay.

Stage 404: Analyze mid-level nodes.

Stage 404 phase 415: Create section sub-tree, including section root 206, and container node 209.

Stage 404 phase 416: Calculate paths of fragments 207 and smaller sections 204 relative to section root 206. The path may be added as fragment identifier to fragment root 213, fragment attributes, and fragment link 207. In some embodiments, the fragment identifier path facilitates matching of sub-tree elements and reconstruction of the document tree from document sub-trees.

Stage 404 phase 417: Process cross references. In some embodiments, the links to other web content and embedded objects may be maintained in section level. The maintenance of cross-references may include mapping of cross-references inside the document, replacement of relative paths by absolute paths to mirror sites or databases, single-sign-on activation with registered sites or other suitable processing.

Stage 404 phase 418: Process section history. In some embodiments, the section may hold references to multiple versions of fragments. In some embodiments, the section may be created by segmentation from a larger existing section. In some embodiments, the section may differ between various users. The modifications of the section may require version management, processing of section history and document history, and conflict resolution.

Stage 404 phase 419: Process section statistics. A section may be associated with statistics, including section ranking, user voting, section size, cross-reference number and other suitable statistics. Section statistics may be inferred from multiple documents based on one section, section segmented from larger section, section updated from existing section, or other suitable section operations.

Stage 404 phase 420: Process virtual fragments. A section may be associated with virtual fragments 208 to enable manipulation of section parts. The virtual fragments 208 associated with a section may be created, initialized, modified, deleted, and otherwise maintained in the phase 420.

Stage 405: Analyze top-level nodes.

Stage 405 phase 421: Calculate paths of sections, relative to the document root. The section paths facilitate recombination of the full document from multiple sections. If many sections share similar paths or section paths are very long, intermediate sections may be created to facilitate navigation within document.

Stage 406: Analyze metadata and update indices.

Stage 406 phase 422: Calculate checksums or other suitable descriptors. The checksums may be calculated for sections, for fragments and for embedded objects. The checksum may be used for data integrity verification, duplicate data detection and removal or other suitable applications.

Stage 406 phase 423: Process user data, including user tagging, annotation, commenting, highlighting, personalization, and other suitable user operations performed on document or its parts. For example, many web sites enable users with capability to change physical location of document sections, add document sections and remove documents sections, such as widgets, frames, feeds and other suitable section implementations.

Stage 406 phase 424: Process document history, including modifications in section structures, update of section and fragment paths, deletion, insertion, modification or replication of sections, reference count maintenance, merge of documents and user views and other version or history-related information.

Stage 406 phase 425: Process A-Z book or other suitable search indices, including document dictionary, word count in sections and fragments of the document, existence of blacklisted word combinations, semantic tagging on sections and fragments of the document or other suitable text processing algorithms.

Stage 407: Cache sub-trees for further use and incremental document updates.

FIG. 5 illustrates a method for updating structured document, according to an embodiment of the invention.

After sub-tree decomposition described on FIG. 4, document may be updated in incremental update process, as described on FIG. 5.

Stage 501: Get document. While downloading the document from content provider (Get new document 401), a cached version of the document may be retrieved (Get sub-trees 502) and prepared (Preprocess for XML diff 503) for comparison with the new document.

Stage 501 phase 502: Get sub-trees. The sub-trees of the document may be stored in stage 407 for later usage. These sub-trees and related metadata may be retrieved from the databases in phase 502.

Stage 503: Preprocess for XML diff. The XML diff may be performed between the original document and the new document. The original document may be stored separately. To minimize duplicate storage, the original document may also be reconstructed from the stored sub-trees. As a result of stage 503, the stored sub-trees may be recombined into the original document.

Stage 503 phase 510: Create replica. For operations other than the XML comparison, the metadata present in the XML sub-trees may be required, so dedicated copy of XML sub-trees may be created specifically for XML comparison purposes.

Stage 503 phase 511: Merge sub-trees, including selection of the correct versions of sections and fragments and merging multiple sub-trees into one document. During the merge the pairs of nodes 204, 206 and 217,213 may be merged into nodes in the original tree.

Stage 503 phase 512: Remove metadata. For XML comparison purposes, the metadata 205, 209, 214, 208 may be removed.

Stage 504: Perform XML diff between the reconstructed document and the new document.

Stage 505: Large differences decision. If the XML diff produces multiple and large differences, the document may undergo new sub-tree creation process (506), otherwise incremental sub-tree maintenance (507) may be performed.

Stage 506: Create sub-trees. Create a new hierarchy of sub-trees using algorithms described on FIG. 4. The duplicate sections and fragments may be reused, but the section structure may change significantly.

Stage 507: Process differences. Add the differences to the existing sections and fragments structure incrementally. If incremental modification fails, create sub-trees using stage 506.

Stage 507 phase 513: Register differences. Register the differences found by XML-diff into the replica of original document, and from the replica of original document to the cached sub-trees structure.

Stage 507 phase 514: Modify sub-trees. The differences found in 504 may be translated into specific sub-tree operations, including by way of illustration:

a. Sub-tree modification 1: Creation of sub-tree, including new section with fragment, new fragment, new section between existing section and fragment relationships or other suitable sub-trees.

b. Sub-tree modification 2: Deletion of sub-tree, including fragments, sections and sections with fragments.

c. Sub-tree modification 3: Modification of sub-tree, including keeping older version of the sub-tree and creating a new version of sub-tree with different objects and attributes.

Stage 507 phase 515: Update metadata, including update of search indices, update of section and document histories, update of paths, update of cross-references and any other suitable updates.

Stage 508: Process metadata for applications. Some metadata may be stored in server side session, while some metadata may be added to the reconstructed and updated document and sent to the client. Moreover, front-end protocol 303 may enable transfer of metadata between the server and the client while the session is active.

Stage 509: Run applications. Applications may utilize the sub-tree metadata on client side or on server side for specific functionality, as described in this patent.

Figure 6:
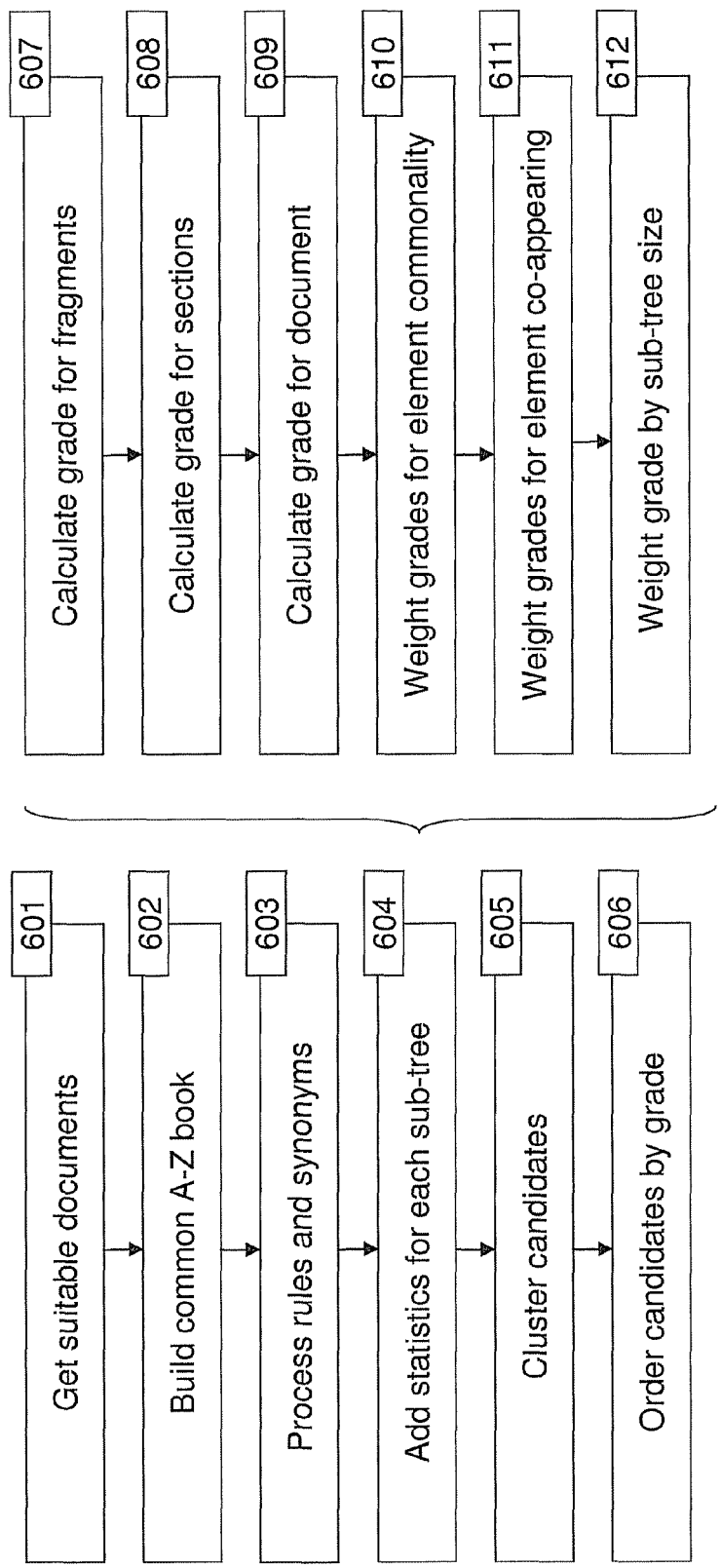
FIG. 6 illustrates a method for search-within-search, according to an embodiment of the invention.

FIG. 6 illustrates a method for search-within-search, according to an embodiment of the invention.

Stage 601: Get suitable documents. The suitable documents may be determined by preliminary search operation. For example, the search-in-search operation may be executed on 20 best candidates found by Google™ search, or on first page of Digg™. Each document may be subdivided into sub-trees as described on FIG. 4 and FIG. 5. If the document's link is not available, cached version of the document may be used.

Stage 602: Build common A-Z book. The A-Z books or other suitable indices of the candidate documents may be merged into common index for all documents of interest.

Stage 603: Process rules and synonyms. It may be possible to search not only for words provided by the query, but also for their synonyms and variations. Moreover, the user may define complex processing rules and logic for sets of words, their mutual co-appearance and their variation.

Stage 604: Add statistics for each sub-tree, including search grade.

Stage 604 phase 607: Calculate grade for fragments. A grade may be given to each fragment based on number of keywords or synonyms in the fragment, or based on other suitable rule. A grade may appear as vector or other data structure with multiple elements. For example, the grade may be a vector with elements indicating number of appearances of each keyword inside the fragment.

Stage 604 phase 608: Calculate grade for sections. A grade may be given to each section based on grades of fragments within the section.

Stage 604 phase 609: Calculate grade for document. A grade may be given to document or group of document based on grades of sections within the document.

Stage 604 phase 610: Weight grades for element commonality. The grade structure may be weighted accordingly to commonality of each element in the grade data structure, so that the rare elements may get higher weight.

Stage 604 phase 611: Weight grades for element co-appearing. Weight grades may be transformed from multiple elements structure to scalar or suitable structure with lower dimensionality, based on co-appearance of elements within fragment or section. For example, the co-appearance grade may be calculated as multiplication of grade vector elements (with small bias to eliminate multiplication by zero).

Stage 604 phase 612: Weight grade by sub-tree size. The grades may be weighted to give preference for smaller sections and fragments. For example, the grade may be divided by monotonic non-descending function of number of characters inside the fragment or section.

Stage 605: Cluster candidates. Select the level of sub-tree for each candidate, including sections, fragments and virtual fragments. Since the sections may infer candidates from the fragments of sections, the candidates may have duplicated association. The candidate association may be resolved in stage 605, by choosing sub-tree level with highest search grades.

Stage 606: Order candidates by grade. Navigation between the candidates may be performed by the user based on candidate grade.

Figure 7:
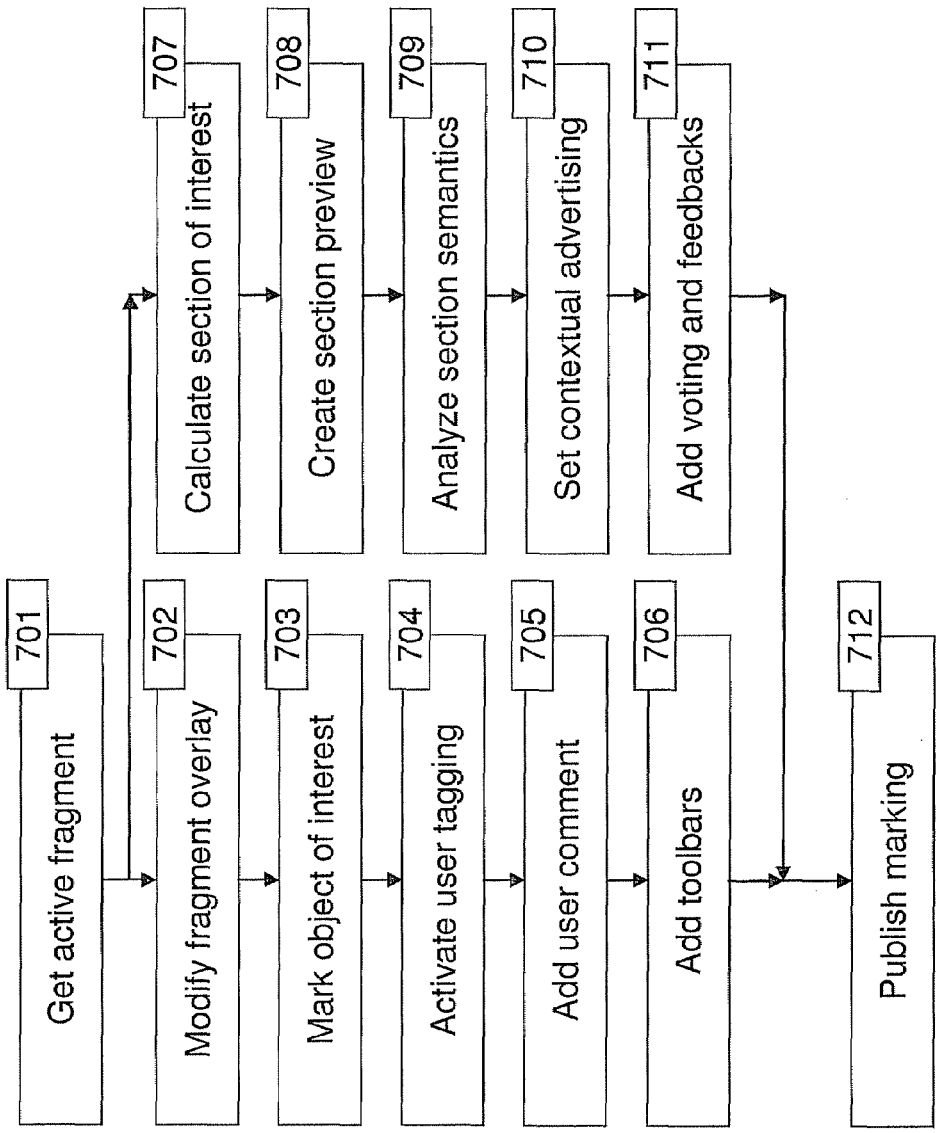
FIG. 7 illustrates a method for contextual marking and advertising, according to an embodiment of the invention.

FIG. 7 illustrates a method for contextual marking and advertising, according to an embodiment of the invention.

Stage 701: Get active fragment. The user may select active fragment for commenting or marking via and notify the server via front-end protocol (such as AJAX) of fragment selection.

Stage 702: Modify fragment overlay. The overlay of the active fragment may be modified to enable user marking and tagging of the fragment of interest.

Stage 703: Mark object of interest. In some embodiments, the graphical marking of the object of interest may be given with offset relative to the fragment. For example, marking of 25-52 characters of a paragraph, marking of image on pixels with top-left (144, 26) and bottom-right (196, 57), marking of 27th-55th seconds of video.

Stage 704: Activate user tagging. The user may be presented with an interface for tagging, title-giving or otherwise semantically marking the fragment of interest.

Stage 705: Add user comments. The user may be presented with an interface for adding annotations, comments, talkbacks and other response to the fragment of interest.

Stage 706: Add toolbars. The user may be given toolbar for further operations on marked content, including by way of illustration voting, ranking, commenting on existing comments, highlighting, publishing, sending, printing, navigating.

Stage 707: Calculate section of interest, using fragment identification, document layout, user tagging and other suitable features. In some embodiments, the section may be selected or segmented sufficiently large to provide the context of the fragment and sufficiently small to fit within preview window size.

Stage 708: Create section preview, including thumbnail, RSS feed, HTML document or any other suitable form of preview content.

Stage 709: Analyze section semantic, including user tagging, common keywords, document metadata and other suitable features.

Stage 710: Set contextual advertising, based on section semantics. The sections containing marked fragments may result in more user attention than unmarked sections. In large documents the semantic context of each section may be different. Putting contextual advertising based on marked sections may result in higher advertising efficiency.

Stage 711: Add voting and feedbacks, enabling further user content generation on marked section.

Stage 712: Publish markings, including publishing on portal 302, publishing on social bookmarking sites, publishing in personal blogs and corporate portals and other suitable forms of publishing.

Figure 8:
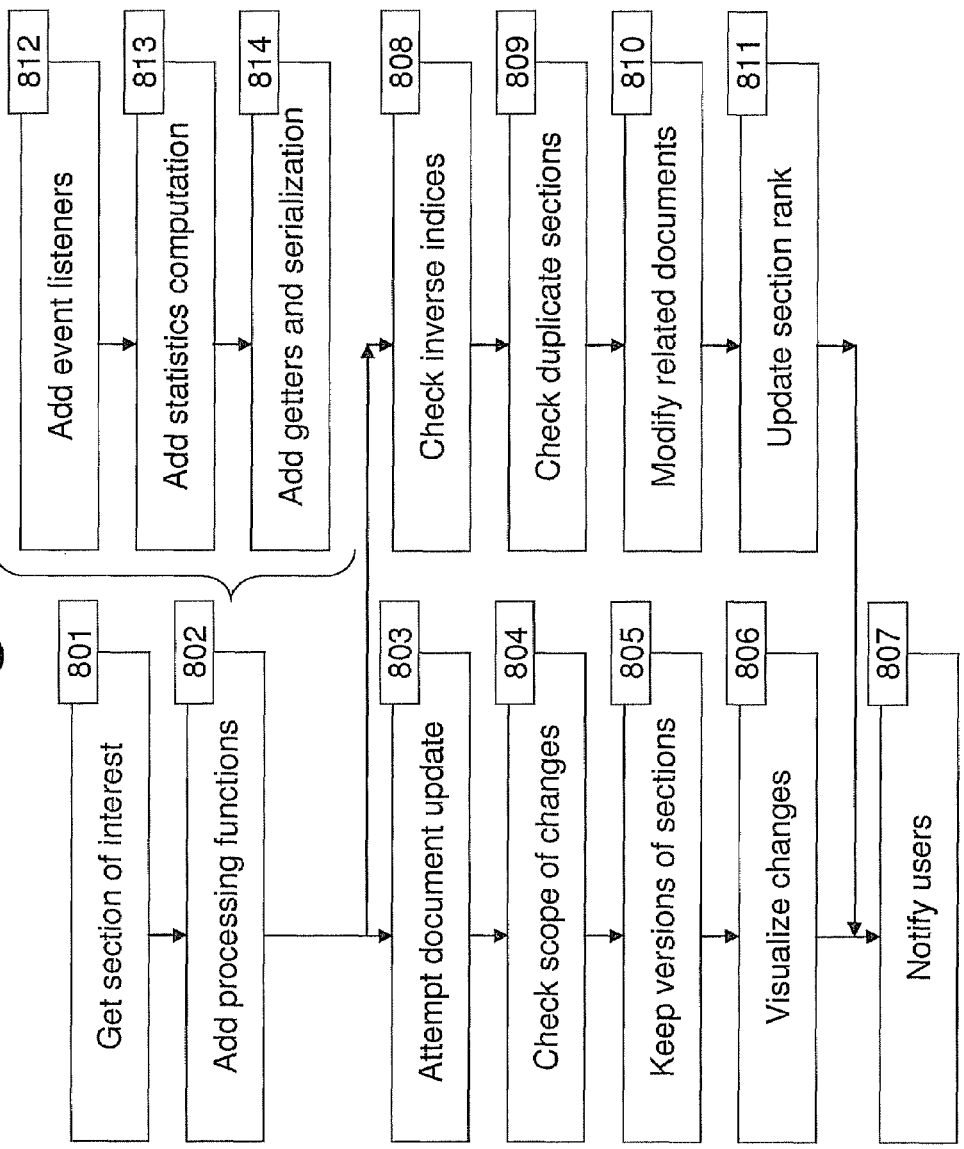
FIG. 8 illustrates a method for version management and notification, according to an embodiment of the invention.

FIG. 8 illustrates a method for version management and notification method, according to an embodiment of the invention.

Stage 801: Get section of interest. The section of interest for user notification may be selected by user markings, by search results, or by any other suitable mechanism.

Stage 802: Add processing functions. The section of interest may be formatted to include processing functions, to facilitate programming and scripting.

Stage 802 phase 812: Add event listeners, including user mouse location tracking and key pressing capturing functions. The event listeners may enable statistics gathering and user modification to the section of interest, including by way of illustration forwarding notification, accepting changes and rejecting changes.

Stage 802 phase 813: Add statistics computation, including by way of illustration, graphical display of changes along time and ranking of the section of interest with respect to the related documents.

Stage 802 phase 814: Add getters and serialization, including by way of illustration functions for navigation to the section of interest, AJAX communication with the section of interest and serialization of section of interest for notification protocols.

Stage 803: Attempt document update. A document containing section of interest may be updated based on rules and policies. For example, an algorithm on FIG. 5 may be executed daily to verify validity of the section of interest.

Stage 804: Check scope of changes. The document changes outside the section of interest may be of little importance to the users and therefore may generate no user notification.

Stage 805: The older versions of the section of interest may be kept along with the new versions of the section of interest, enabling modifications display, history browsing and "undo" operations.

Stage 806: Visualize changes. The changes between various versions of sections of interest may be visualized in the section of interest. For example, an overlay layer may be used to visualize price changes of the object selected by the user for price monitoring. In some embodiments, the sections outside the section of interest may be not rendered, due to display and visibility attributes of the sections.

Stage 807: Notify users on changes and send changes visualization via e-mail, MMS or other suitable notification method.

Stage 808: Check inverse indexing. A section of interest may appear in multiple documents, so that modifications in section of interest may infer different users, websites and documents.

Stage 809: Check duplicate sections. A section of interest or its fragments may be modified to become duplicate of some other section in some document. Duplicate objects may be detected based on checksums. Duplicate objects may be removed and metadata modified, including by way of illustration reference counts, links, and inverse indices.

Stage 810: Modify related documents. Check related documents, indicated by inverse indexing, for similar section updates of the section of interest and notify users holding these related documents.

Stage 811: Update section rank. The section rank may be inferred from features including by way of illustration page view statistics, mouse position, click and markings of multiple versions of the section in multiple documents. The tables for section rank computation may be modified to include new versions of the section.

Figure 9:
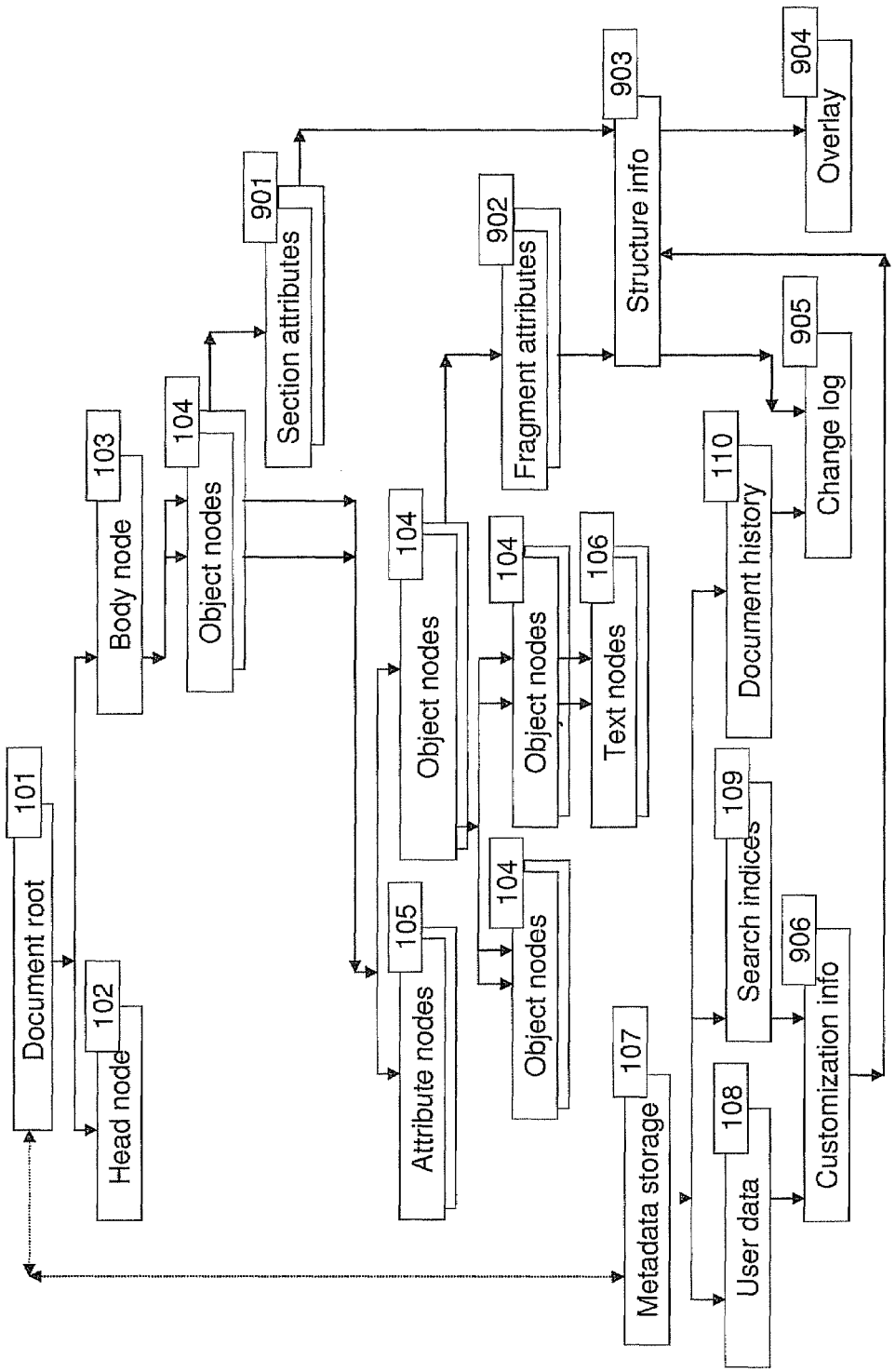
FIG. 9 illustrates a system architecture, according to an embodiment of the invention.

In some embodiments, the multi-resolution approach may be manifested in attributes and tags of nodes and fragments. FIG. 9 illustrates a system architecture, according to an embodiment of the invention, which may be utilized for applications using single tree representation system.

Block 901 section attributes, including location in the document, tree path, name, checksum, number of included fragments, location on screen or other suitable attributes.

Block 902 fragment attributes, including location in the document, tree path, name, checksum, included text, included links and images, location on screen, overlays or other suitable attributes.

Block 903 structure info, including references to nodes, section attributes, fragment attributes and other suitable objects. The structure info may be implemented as a tree of sections and fragments, hash table of important nodes, other suitable data representation or combination of thereof.

Block 904 overlay may include user comments, search results, graphical overlays or any other form of visual commenting.

Block 905 changelog may include references to structure info nodes that were modified, including creation date, modification date, deletion date, new content, old content, modified content, moved content, replaced content, checksums, name of the element and other suitable information.

Block 906 customization info may include search results representation, transcoding information, national language translation, injected javascripts or other suitable objects.

Figure 10:
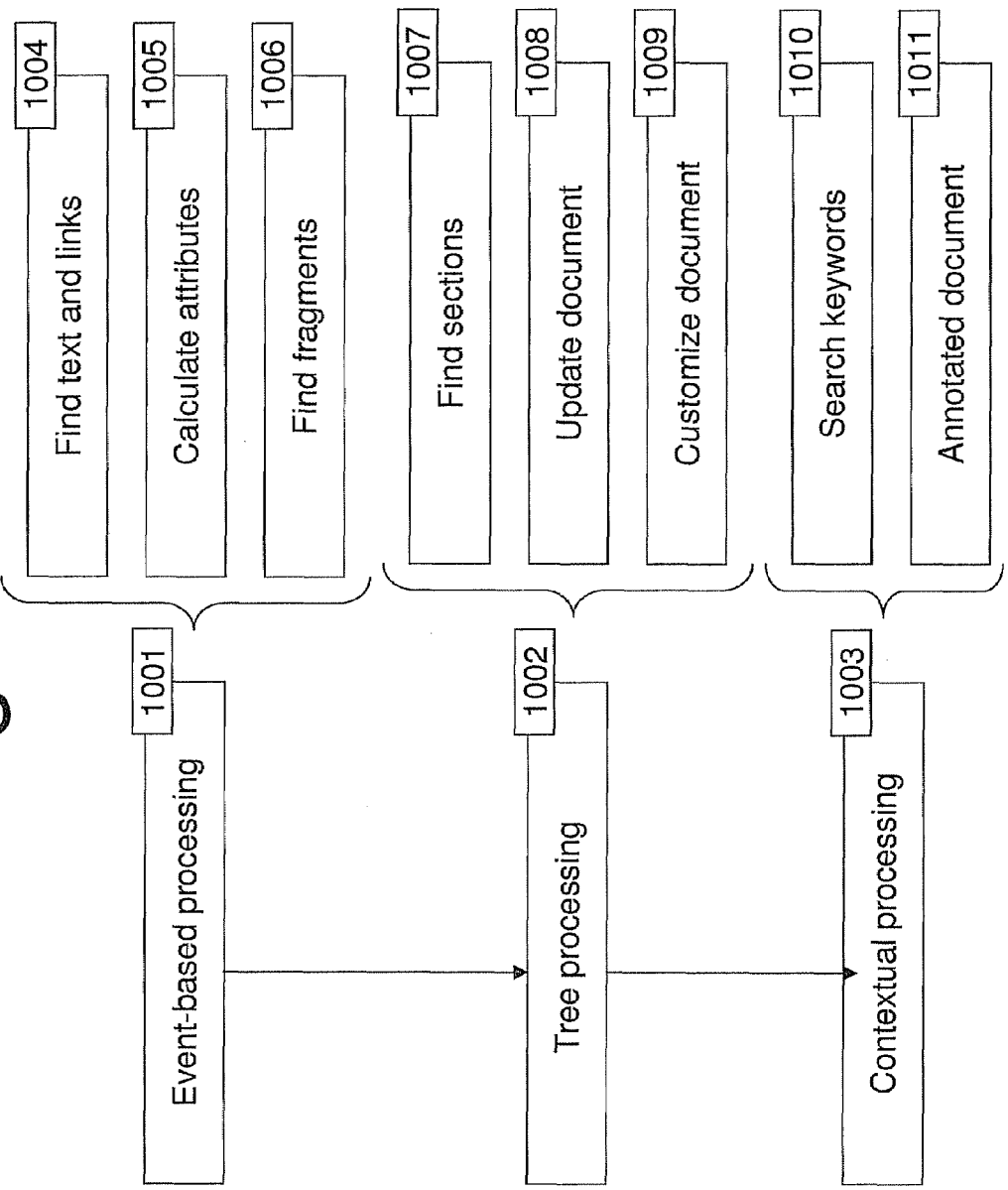
FIG. 10 illustrates a method for document processing using single tree representation system, according to an embodiment of the invention.

FIG. 10 illustrates a method for document processing, according to an embodiment of the invention, which may utilize, for example, a single tree representation system.

Phase 1001: Event-based processing. When the document is parsed, callback methods (for example SAX handler methods) may be associated with document structure processing, including Phase 1001 stage 1004: Finding text and links. Text and links may be later used for various processing functions. For example, the text may be found as text nodes children of element nodes, and links may be found via "href" and "src" attributes.

Phase 1001 stage 1005: Calculate attributes, including line and column of the event in the document, path of the node, or other suitable properties.

Phase 1001 stage 1006: Try to find fragments when an element ends. For example, a fragment may be the smallest atomic object with at least 400 text characters or one link. An atomic object may be marked, searched and modified w/o affecting the validity of its parent object and resulting in meaningful results. In some embodiments, the each fragment generates a checksum, for example using checksum of outerHTML attribute of the fragment node and path of the node. In some embodiments, each fragment is assigned a unique name based on its checksum.

Phase 1002: Tree processing, including for example DOM processing. After the document is parsed, it may be analyzed top-down from the root node.

Phase 1002 stage 1007: Find sections, using decision logic. For example, a section must contain more than one fragment, and at least two of its children must contain at lease one fragment or section each.

Phase 1002 stage 1008: Update document. The document may be updated in several forms.

Update form 1: Recalculate section attributes, including paths, checksums, embedded text. The section attributes may be calculated recursively from the attributes of sections and fragments at lower levels, with stopping condition of reaching fragment node.

Update form 2: Compare top-down with previous version of the document, update names of the objects, checksums and changelog. The previous version of the document may be stored in cache. If the previous and the current versions of the document are different, an update may be performed. The names of the nodes may be reverted to the oldest relevant version, so that the applications addressing these names remain functional.

Update form 3: Insert frames and embedded documents. The document of interest may include additional documents, for example as frames. These additional documents may be inserted into the original documents, so that the objects are addressable without cross-site scripting effects.

Update form 4: Recalculate statistics, including ranking, number of impressions, number of cross-references, voting or other suitable statistics. The statistics may be applied at the level of format and induced to sections containing the fragments of interest.

Phase 1002 stage 1009: Customize document.

Customization form 1: Insert macros and javascripts, including macros for overlay, search, advertising or other suitable applications.

Customization form 2: Transcode for local device, including reformatting the original document into outline of content and reformatting fragments into mini-pages, transcoding of embedded objects into formats readable by the local device, transcoding AJAX and FLASH interfaces into simple HTML and other suitable transcoding.

Customization form 3: Insert advertising, including advertising based on context analysis, behavioral advertising or other suitable advertising.

Customization form 4: Selective masking, including masking sensitive private information in public documents. The masked information may be replaced by default placeholders for characters, images or other suitable content.

Phase 1003 contextual processing. Some processing procedures may be performed bottom-up from the fragment nodes.

Phase 1003 stage 1010: Search keywords. For example, compute search results for each fragment, induce the results from fragment to sections and select the relevant resolution for the results.

Phase 1003 stage 1011: Annotate document. For example, enable annotation of the whole document, large sections and fragments. If a fragment is deleted, the annotation may be attached to the relevant section, and if a section is deleted the annotation may be assigned to the document.

Figure 11:
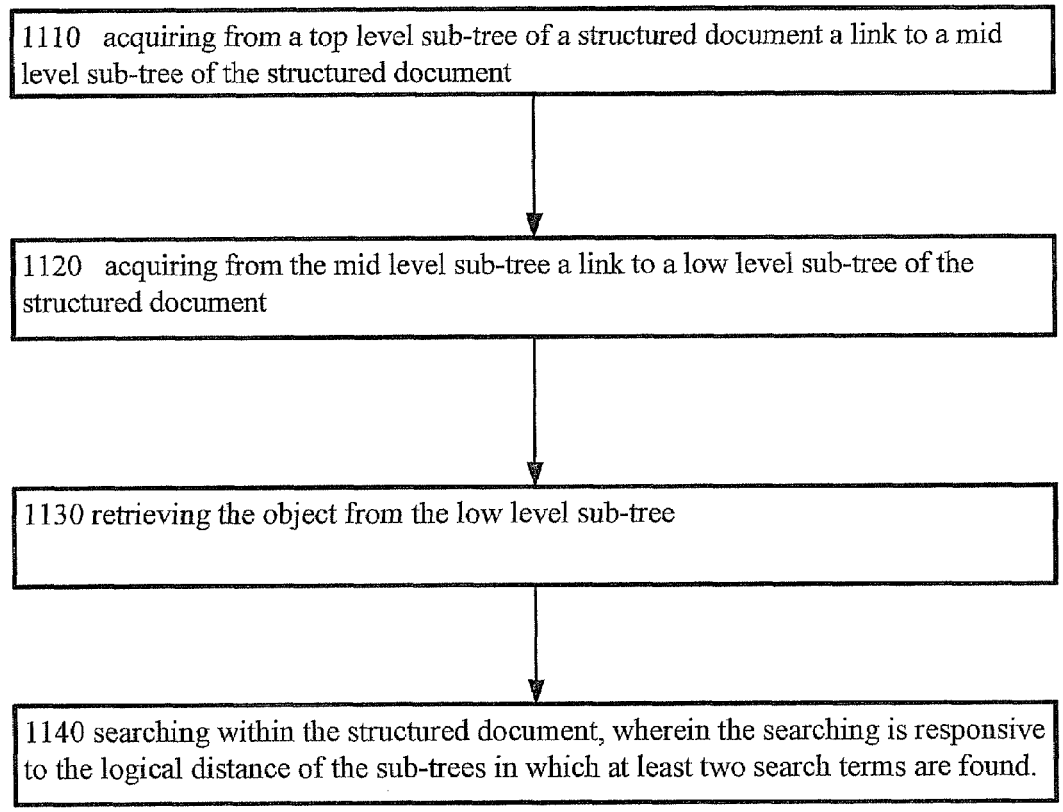
FIG. 11 illustrates a method for accessing data, according to an embodiment of the invention.

FIG. 11 illustrates method 1100 for accessing data, according to an embodiment of the invention. According to various embodiments of the invention, method 1100 may utilize the various structured documents herein disclosed. According to an embodiment of the invention, method 1100 may utilize structured documents generated, updated, managed, or utilized according to one or more of the various methods and processes herein disclosed. Method 1100 may be combined with one or more of the other methods and processes discussed above, or at least with some of the stages of which, as will be clear to a person who is skilled in the art.

Method 1100 may start with stage 1110 of acquiring from a top level sub-tree of a structured document a link to a mid level sub-tree of the structured document; which is followed by stage 1120 of acquiring from the mid level sub-tree a link to a low level sub-tree of the structured document.

It is noted that at least one instance of acquiring a link (i.e. that of stage 1110 and/or that of stage 1120) is responsive to a result of a comparison of a search query data with metadata which pertains to the content of multiple sub-trees, and which is included in at least one of the sub-trees. Such metadata may be any of the ones discussed above, e.g. in relation to method 4000—e.g. unique identifying, content indicative information, attributes information, and so forth.

It is noted that the metadata created may include different types of information, according to various embodiments of the invention, as well as be used for different functionalities. For example, according to an embodiment of the invention, the metadata may be used for retrieval of parts of the document. According to an embodiment of the invention, the metadata may be used for implementing a "goto" functionality, which enables "jumping" to at least one object of interest in the browser for display. According to an embodiment of the invention, metadata may be utilized for indexing, for inserting and/or for updating data at an index position.

According to an embodiment of the invention, the creating of the metadata for a sub-tree may include generating statistics for the sub-tree. For example, such meta data may be used for searching within the structured document, wherein the creating of the metadata may include saving a record of the number of time a word is found within each lower-level sub-tree, which is propagated to higher level sub-trees, as well as possibly saving a record of the size of the sub-trees (e.g. number of characters, links etc). This metadata may later be used for finding sub-trees most informative for a query, which may be presented to the user (e.g. within a search-within-search implementation)

Method 1100 further includes stage 1130 of retrieving the object from the low level sub-tree.

According to an embodiment of the invention, at least one instance of acquiring includes selecting a group of sub-trees that each of which include a content indicative node that include information indicative of type of at least a portion of the content of the sub-tree, wherein content indicative nodes of all the sub-trees in the group includes content indicative information of a single type (e.g. text content, image content, content associated with animals, and so forth), wherein the retrieving is responsive to a result of a search conducted within the group of sub-trees.

According to an embodiment of the invention, method 1100 further include stage 1140 of searching within the structured document, wherein the searching is responsive to the logical distance of the sub-trees in which at least two search terms are found.

It is noted that the searching of stage 1140 may be conducted within search results of a previous search, but this is not necessarily so. For example, if a web-engine search provided top twenty results for searching for the terms "blessing" and "oblivion", stage 1140 may search within these twenty results, and favour the documents in which these two terms frequently appears in the same paragraphs. It is noted that alternatively (or additionally), the searching of stage 1140 may be responsive to other metadata or metric of the sub-trees—e.g. searching for documents in which the two terms appears in user comments, appears in image description, in very large font, and so forth. While such searches may be conducted in non-structured documents as well, such searches within structured documents as herein disclosed is much faster.

According to an embodiment of the invention, method 1100 further includes comparing an identifier information to at least one unique identifier stored in at least one sub-tree, and selectively updating the sub-tree in response to a result of the comparison. This may enable, for example, updating a document section/fragment, only if this section/fragment was modified in respect to previous version of the document.

Method 1100 may further include one or more stage of utilizing the at least one retrieved object, such as by displaying it, printing it, writing it to a tangible medium, and so forth.

Figure 12:
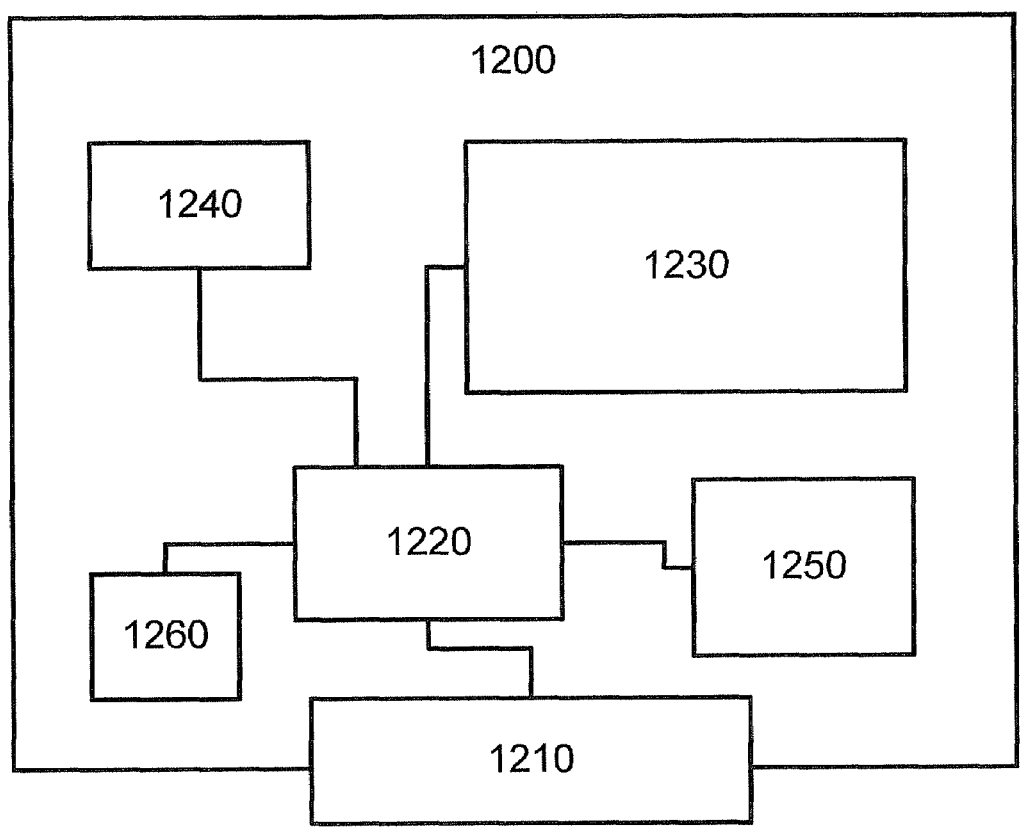
FIG. 12 illustrates a system, according to an embodiment of the invention.

FIG. 12 illustrates data management system 1200, according to an embodiment of the invention. it is noted that some embodiments of system 1200 may implement one or more embodiments of method 4000.

System 1200 includes input interface 1210 for acquiring a source document, e.g. from a memory unit in which it is stored, which may be included in system 1200, but not necessarily so. Such memory unit may be memory unit 1220 of system 1200, which is configured to store structured documents (e.g. such as the ones discussed above). The acquiring may also be from an external source (wherein some or all of the portions of the source document may be stored for processing in memory module 1220).

System 1200 further includes processor 1230 which is configured to: (a) divide the source document into multiple objects in response to content of the source document; (b) analyze the multiple objects to generate multiple low level sub-trees, wherein each of the low level sub-trees includes at least one of the multiple objects; (c) generate multiple mid level sub-trees, wherein each of the mid level sub-trees includes link to at least one of the low level sub-trees; (d) generate a top level sub-tree that includes multiple section links, wherein each of the section links links to one of the mid level sub-trees; (e) create metadata descriptive of at least one of the sub-trees generated, wherein the metadata includes data which is not included in the source document; and (f) generate a structured document that includes the top level sub-tree, at least some of the mid level sub-trees and at least some of the low level sub-trees, and the metadata.

It should be noted that while the structured document is generated as a single entity, it is not necessarily stored as one. According to some embodiments of the invention, some or all of the sub-trees (and especially the lower-level trees) may be stored within another documents (whether structured or partly-structured documents), and may even be stored independently, or within a respective non-document structure (e.g. a hash-table), and may be retrieved independently.

Storing of sub-trees separately from other sub-trees (and/or separately from a master structured document) may ease the accessing and/or linking to those sub-trees by other structured document, as disclosed in the corresponding stages.

According to an embodiment of the invention, processor 1230 is further configured to create for a sub-tree selected from a group consisting of the low level sub-trees and the mid level sub-trees an inverse link to a higher-level sub-tree, and incorporating the inverse link as a node of the sub-tree.

According to an embodiment of the invention, processor 1230 is further configured to create for a sub-tree selected from a group consisting of the low level sub-trees and the mid level sub-trees a reference link to a document, other than the structure document, which links to the sub-tree.

According to an embodiment of the invention, system 1200 includes a retrieving module 1240 (which may be a part of processor 1230, but not necessarily so), configured to retrieve at least one of the objects, by acquiring from the top level sub-tree link to a mid level sub-tree, acquiring from the mid level sub-tree a link to a low level sub-tree, and retrieving the object from the low level sub-tree.

According to an embodiment of the invention, processor 1230 is further configured to process information of one of the sub-trees to generate a unique identifier of the sub-tree, wherein retrieving module 1240 is configured to retrieve the at least one object in response to identifier information, in response to a result of at least one comparison of the identifier information to the unique identifier of at least one sub-tree.

According to an embodiment of the invention, processor 1230 is further configured to create a content indicative node for at least one of the sub-trees selected from a group consisting of the low level sub-trees and the mid level sub-trees, wherein the content indicative node includes information indicative of a type of at least a portion of the content of the sub-tree, wherein retrieving module 1240 is configured to retrieve the at least one object in response to a result of a search for the type of the content.

According to an embodiment of the invention, processor 1230 is further configured to process information of one of the sub-trees to generate a unique identifier of the sub-tree, wherein the system includes an updating module configured to selectively update the sub-tree with updated information, in response to a result of a comparison of identifier information of the updated information to the unique identifier.

According to an embodiment of the invention, system 1200 includes an updating module 1250 (which may be part of processor 1230, but not necessarily so), configured to update a sub-tree selected from a group consisting of the low level sub-trees and the mid level sub-trees, and to update at least one sub-tree that links to the updated sub-tree, to include links to the updated version of the sub-tree, and to an old version of the sub-tree.

According to an embodiment of the invention, system 1200 includes event manager 1260 (which may a part of processor 1230, but not necessarily so), configured to carry out an action which is indicated in an event handler that is stored in one of the generated sub-trees, if an event that is indicated in the event handler occurred.

According to an embodiment of the invention, system 1200 includes updating module 1250 that is configured to receive user selection information indicative of a selection of one or more of the objects, and to update at least one sub-tree which refers to at least one of the selected object in response to the information received from the user.

According to an embodiment of the invention, processor 1230 is further configured to analyze content of the source document, prior to the generating of at least one of the sub-trees, to determine effectiveness of structuring the source document, and to selectively generate at least one of the sub-trees in response to a result of the determining.

According to an embodiment of the invention, processor 1230 is configured to create semantic tags for multiple sub-trees of the structured document, to create a tag cloud of semantic tags for one of the sub-trees; to create a tag cloud of semantic tags of at least a portion of the structured document which excludes the sub-tree; and to create metadata in response to a result of a comparison between the tag clouds.

According to an embodiment of the invention, processor 1230 is further configured to select multiple sub-trees of two or more documents in response to content of a base-node; to create for each of the selected sub-trees metadata information that pertains to the base-node; to generate the mid level sub-trees which are binding at least two of the selected sub-trees; and to generate the top level sub-tree which links to the mid level sub-trees that binds the selected low level sub-trees.

Figure 13:
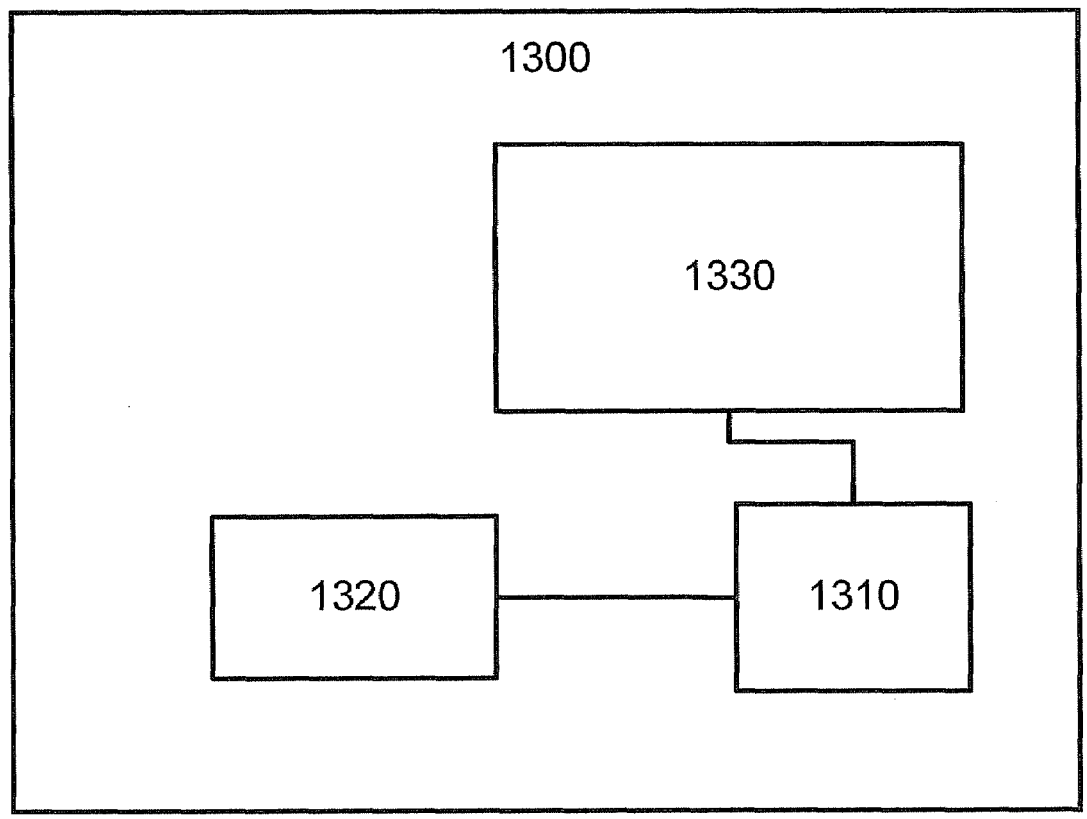
FIG. 13 illustrates a system, according to an embodiment of the invention.

FIG. 13 illustrates data accessing system 1300, according to an embodiment of the invention. It is noted that some embodiments of system 1300 may carry out different embodiments of method 1100.

System 1300 includes interface 1310 for communicating with a memory module in which a structured document is stored (which may be part of system 1300, but not necessarily so, e.g. memory 1320), configured to acquire from the memory module portions of the structured document in response to instructions from a processor.

System 1300 also includes processor 1330, which is configured to: (a) acquire from a top level sub-tree of the structured document, via the interface, a link to a mid level sub-tree of the structured document; (b) acquire from the mid level sub-tree, via the interface, a link to a low level sub-tree of the structured document; and (c) retrieve, via the interface, the object from the low level sub-tree; wherein processor 1330 is further configured to compare search query data with metadata which pertains to the content of multiple sub-trees, and which is included in at least one of the sub-trees, and to acquire at least one of the links in response to a result of the comparison.

According to an embodiment of the invention, processor 1330 is further configured to select a group of sub-trees that each of which include a content indicative node that include information indicative of type of at least a portion of the content of the sub-tree, wherein content indicative nodes of all the sub-trees in the group includes content indicative information of a single type, and to retrieve the object in response to a result of a search conducted within the group of sub-trees.

According to an embodiment of the invention, processor 1330 is further configured to search within the structured document, wherein the searching is responsive to the logical distance of the sub-trees in which at least two search terms are found.

According to an embodiment of the invention, processor 1330 is further configured to compare an identifier information to at least one unique identifier stored in at least one sub-tree, and to selectively update the sub-tree in response to a result of the comparison.

It is noted that, according to an embodiment of the invention, system 1200 and 1300 may be combined in a single system.

Figure 14:
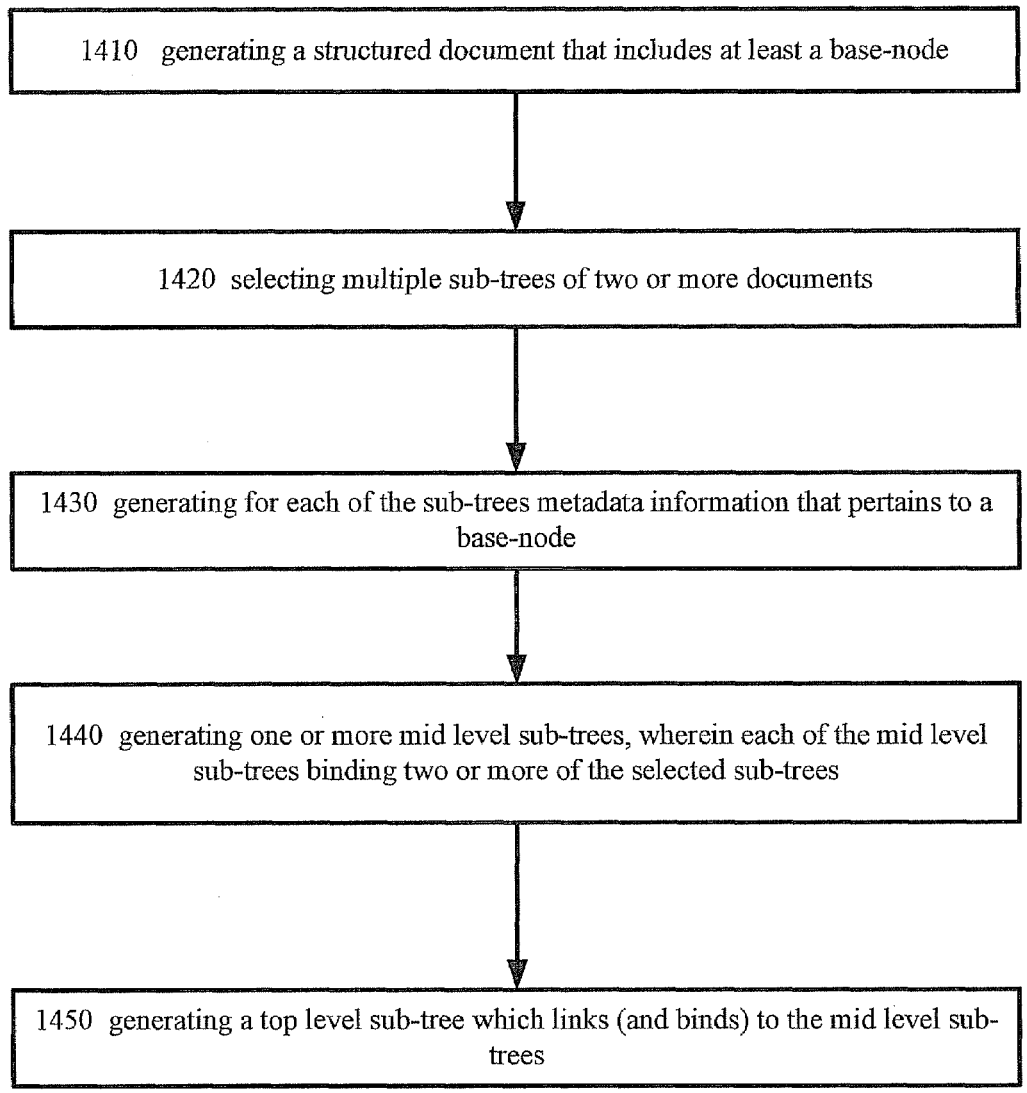
FIG. 14 illustrates a method, according to an embodiment of the invention.

FIG. 14 illustrates method 1400 for structured document generation, according to an embodiment of the invention.

Method 1400 may start with stage 1410 of generating a structured document that includes at least a base-node. The base-node may be associated for example, to a research hypothesis, to a related query, to a tagline, and so forth. Such information may be received from an external source, such as a user or a remote system.

Method 1400 includes stage 1420 of selecting multiple sub-trees of two or more documents (preferably of structured documents, but one or more may be taken from partially structured documents). The selecting may be responsive to the content of the base-node.

Stage 1430 of method 1400 includes generating for each of the sub-trees metadata information that pertains to a base-node. The metadata may relate to the relevancy to the base-node (e.g. to the base-node query, hypothesis, and so forth). It is noted that the metadata of each of the sub-trees may be added to the sub-tree itself, may be stored in a structure of the newly created structure document, and may be stored in another data structure referenced in the new structured document.

Stage 1440 of method 1400 includes generating one or more mid level sub-trees, wherein each of the mid level sub-trees binding two or more of the selected sub-trees. The binding may be carried out using different techniques, e.g. using a mindmap technology, such as decision tree.

Stage 1450 of method 1400 includes generating a top level sub-tree which links (and binds) to the mid level sub-trees (e.g. as a project or topic description). It is noted that the top level sub-tree may include the base-note (potentially as a root-node), but this is not necessarily so.

It is noted that each of the lower sub-trees may be referenced by multiple higher level sub-trees, as in the document.

It is noted that method 1400 may include mixing sub-trees originating from different sources, such as web pages tags, semantic tags, and application-specific tags.

Method 1400 may be carried out by a system such as system 1200 and 1300, or by other systems.

It is noted that according to various embodiments of the invention, some or all of the methods and processes disclosed above may be implemented by a computer readable medium, having a computer readable code embodied therein, wherein the computer readable code includes intrusions executable by one or more processors for carrying out the different stages of the respective process or method.

By way of example, computer readable codes corresponding to methods 1100 and 4000 are disclosed below. similar computer program products may be made for the other methods and processes disclosed.

Referring to method 4000, a first computer readable medium having a first computer readable code embodied therein for improving data accessibility, the first computer readable code includes instructions for: (a) acquiring a source document; (b) dividing the source document into multiple objects, in response to content of the source document; (c) analyzing the multiple objects to generate multiple low level sub-trees, wherein each of the low level sub-trees includes at least one of the multiple objects; (d) generating multiple mid level sub-trees, wherein each of the mid level sub-trees includes link to at least one of the low level sub-trees; (e) generating a top level sub-tree that includes multiple section links, wherein each of the section links links to one of the mid level sub-trees; (f) creating metadata descriptive of at least one of the sub-trees generated, wherein the metadata includes data which is not included in the source document; and (g) generating a structured document that includes the top level sub-tree, at least some of the mid level sub-trees and at least some of the low level sub-trees, and the metadata.

According to an embodiment of the invention, the first computer readable code further includes instructions for creating for a sub-tree selected from a group consisting of the low level sub-trees and the mid level sub-trees an inverse link to a higher-level sub-tree, and for incorporating the inverse link as a node of the sub-tree.

According to an embodiment of the invention, the first computer readable code further includes instructions for creating for a sub-tree selected from a group consisting of the low level sub-trees and the mid level sub-trees a reference link to a document, other than the structure document, which links to the sub-tree.

According to an embodiment of the invention, the first computer readable code further includes instructions for retrieving one of the objects, wherein the retrieving includes acquiring from the top level sub-tree link to a mid level sub-tree, acquiring from the mid level sub-tree a link to a low level sub-tree, wherein the first computer readable code further includes instructions for and retrieving the object from the low level sub-tree.

According to an embodiment of the invention, the first computer readable code further includes instructions for processing information of one of the sub-trees to generate a unique identifier of the sub-tree, wherein the retrieving is responsive to identifier information, wherein the retrieving includes retrieving the object in response to a result of at least one comparison of the identifier information to the unique identifier of at least one sub-tree.

According to an embodiment of the invention, the first computer readable code further includes instructions for creating a content indicative node for at least one of the sub-trees selected from a group consisting of the low level sub-trees and the mid level sub-trees, wherein the content indicative node includes information indicative of a type of at least a portion of the content of the sub-tree, wherein the instructions included in the first computer readable code for retrieving includes instructions responsive to a result of a search for the type of the content.

According to an embodiment of the invention, the first computer readable code further includes instructions for processing information of one of the sub-trees to generate a unique identifier of the sub-tree, and for updating the sub-tree with updated information, wherein the updating is selectively carried out in response to a result of a comparison of identifier information of the updated information to the unique identifier.

According to an embodiment of the invention, the first computer readable code further includes instructions for updating a sub-tree selected from a group consisting of the low level sub-trees and the mid level sub-trees, and for updating at least one sub-tree that links to the updated sub-tree, to include links to the updated version of the sub-tree, and to an old version of the sub-tree.

According to an embodiment of the invention, the first computer readable code further includes instructions for creating an event handler for one of the generated sub-trees, wherein the event handler is included in the sub-tree, and for carrying out an action which is indicated in the event handler, if an event that is indicated in the event handler occurred.

According to an embodiment of the invention, the first computer readable code further includes instructions for receiving from a user selection information indicative of a selection of one or more of the objects, and for updating at least one sub-tree which refers to at least one of the selected object in response to the information received from the user.

According to an embodiment of the invention, the first computer readable code further includes instructions for analyzing content of the source document to determine effectiveness of structuring the source document, and for selectively generating at least one of the sub-trees in response to a result of the determining.

Referring to method 4000, a second computer readable medium having a second computer readable code embodied therein for accessing data, the second computer readable code includes instructions for: (a) acquiring from a top level sub-tree of a structured document a link to a mid level sub-tree of the structured document; (b) acquiring from the mid level sub-tree a link to a low level sub-tree of the structured document; and (c) retrieving the object from the low level sub-tree; wherein at least one instance of acquiring a link is responsive to a result of a comparison of a search query data with metadata which pertains to the content of multiple sub-trees, and which is included in at least one of the sub-trees.

According to an embodiment of the invention, the second computer readable code further includes instructions for selecting a group of sub-trees that each of which include a content indicative node that include information indicative of type of at least a portion of the content of the sub-tree, wherein content indicative nodes of all the sub-trees in the group includes content indicative information of a single type, wherein the second computer readable code further includes instructions for wherein the retrieving which is responsive to a result of a search conducted within the group of sub-trees.

According to an embodiment of the invention, the second computer readable code further includes instructions for searching within the structured document, wherein the searching is responsive to the logical distance of the sub-trees in which at least two search terms are found.

According to an embodiment of the invention, the second computer readable code further includes instructions for comparing an identifier information to at least one unique identifier stored in at least one sub-tree, and for selectively updating the sub-tree in response to a result of the comparison.

According to various embodiments of the invention, a structured document is disclosed, including a top level sub-tree (root), multiple mid level sub-trees, and multiple low level sub-trees; wherein the top level sub-tree includes links to mid level sub-trees (and possibly also to low level sub-trees), and may also include document structure information, links to content of different versions/replicas the documents or portions of which, fragment search indices which relates to lower level sub-trees, and so forth; wherein each of the mid level sub-trees includes links to low level sub-trees, and may possibly further includes links to other mid level sub-trees, and inverse indices to one or more top-level sub-tree, unique identification information, paths of elements inside the mid level sub-tree which may be relative to the section root, event handlers, history information, statistics information, and so forth; wherein each of the low level sub-trees includes at least one object or a pointer to an object, and may possibly further include overlay node, semantic tag, and so forth. It is noted that such structured document may be utilize by the different systems, methods, and computer program products herein described.

With respect to the above description, it is to be realized that the optimum dimensional relationships for the parts of the invention, to include variations in size, form, function and manner of operation, integration and use, are deemed readily apparent and obvious to one skilled in the art, and all equivalent relationships to those illustrated in the drawings and described in the specification are intended to be encompassed by the present invention.

Therefore, the foregoing is illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

It should be noted that the aforementioned systems, methods, processes, and computer program products may do more than efficiently manage and handle documents. Implementing them may have great impact on reduced computational times in many situations (e.g. searching only within user talkbacks), reduced computational requirements and load, reduced memory reads (information is stored logically in the structured document, and thus retrieval of information does not require collecting small amounts of data from many fragments, as may be the case with otherwise structured—or not structured—document. The number of writing to memory may also be reduced.

Also, the aforementioned systems, methods, processes, and computer program products may enable efficient modification of documents, which enables complex utilization of modifying, commenting, updating, and reviewing by many users.

All the outcomes of the aforementioned systems, methods, processes, and computer program products (e.g. structured documents, portions thereof, metadata, etc.) may be put into tangible manner in various ways, e.g. by being printed, by being transmitted as an electronic signal—or any other known for of signaling, by being written to a tangible storage medium, and so forth.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for improving data accessibility, the method comprising:
dividing a source document into multiple objects, in response to content of the source document; the multiple objects comprise sections and fragments, each section comprises a plurality of fragments;
analyzing the multiple objects to generate multiple low level sub-trees, wherein each of the low level sub-trees is associated with a fragment and comprises the fragment;
generating multiple mid-level sub-trees, wherein each of the mid-level sub-trees is associated with a unique section of the source document and comprises a link to each one of the low level sub-tree that are associated with the plurality of the fragments of the unique section;

generating a top level sub-tree that comprises multiple section links, wherein each of the section links links to one of the mid-level sub-trees;

creating metadata descriptive of at least one of the sub-trees generated, wherein the metadata comprises data which is not comprised in the source document; and generating a structured document that comprises the top level sub-tree, at least some of the mid- level sub-trees and at least some of the low level sub-trees, and the metadata;

wherein the generating comprises writing the structured document to a tangible memory;

wherein the method further comprises: retrieving one of the objects, wherein the retrieving includes acquiring from the to level sub-tree a link to a mid-level sub-tree, acquiring from the mid-level sub-tree a link to a low level sub-tree and retrieving the object from the low level sub-tree; and creating an event handler for a sub-tree wherein the event handler is included in the sub-tree;

wherein the creating comprises carrying out an action which is indicated in the event handles, if an event that is indicated in the event handler occurred.

2. The method according to claim 1, further comprising creating for a sub-tree selected from a group consisting of the low level sub-trees and the mid-level sub-trees an inverse link to a higher-level sub-tree, and incorporating the inverse link as a node of the sub-tree.

3. The method according to claim 1, further comprising creating for a sub-tree selected from a group consisting of the low level sub-trees and the mid-level sub-trees a reference link to a document, other than the structure document, which links to the sub-tree.

4. The method according to claim 1, further comprising retrieving one of the objects, wherein the retrieving comprises acquiring from the top level sub-tree link to a mid-level sub-tree, acquiring from the mid- level sub-tree a link to a low level sub-tree, and retrieving the object from the low level sub-tree.

5. The method according to claim 4, further comprising processing information of one of the sub-trees to generate a unique identifier of the sub-tree, wherein the retrieving is responsive to identifier information, wherein the retrieving comprises retrieving the object in response to a result of at least one comparison of the identifier information to the unique identifier of at least one sub-tree.

6. The method according to claim 4, further comprising creating a content indicative node for at least one of the sub-trees selected from a group consisting of the low level sub-trees and the mid- level sub-trees, wherein the content indicative node comprises information indicative of a type of at least a portion of the content of the sub-tree, wherein the retrieving is responsive to a result of a search for the type of the content.

7. The method according to claim 1, further comprising processing information of one of the sub-trees to generate a unique identifier of the sub-tree, and updating the sub-tree with updated information, wherein the updating is selectively carried out in response to a result of a comparison of identifier information of the updated information to the unique identifier.

8. The method according to claim 1, further comprising updating a sub-tree selected from a group consisting of the low level sub-trees and the mid-level sub-trees, and updating at least one sub-tree that links to the updated sub-tree, to comprise links to the updated version of the sub-tree, and to an old version of the sub-tree.

9. The method according to claim 1, further comprising receiving from a user selection information indicative of a selection of one or more of the objects, and updating at least one sub-tree which refers to at least one of the selected object in response to the information received from the user.

10. The method according to claim 1, wherein at least one of the stages of generating is preceded by analyzing content of the source document to determine effectiveness of structuring the source document, wherein the at least one stage of generating is selectively carried out in response to a result of the determining.

11. The method according to claim 1, wherein the creating of the metadata comprises creating semantic tags for multiple sub-trees of the structured document, wherein the method further comprises creating a tag cloud of semantic tags for one of the sub-trees; creating a tag cloud of semantic tags of at least a portion of the structured document which excludes the sub-tree; and creating metadata in response to a result of a comparison between the tag clouds.

12. The method according to claim 1, further comprising selecting multiple sub-trees of two or more documents, in response to content of a base-node, wherein the creating of the metadata comprises creating for each of the selected sub-trees metadata information that pertains to the base-node, wherein the generating of at least one mid-level sub-tree comprises generating the mid-level sub-trees which are binding at least two of the selected sub-trees; wherein the generating of the top level sub-tree comprises generating the top level sub-tree which links to the mid-level sub-trees that binds the selected low level sub-trees.

13. A data management system, the system comprising:
an input interface for acquiring a source document; and
a processor configured to:
(a) divide the source document into multiple objects in response to content of the source document; the multiple objects comprise sections and fragments, each section comprises a plurality of fragments;
(b) analyze the multiple objects to generate multiple low level sub-trees, wherein each of the low level sub-trees is associated with a unique section of the source document and comprises a link to each one of the low level sub-tree that are associated with the plurality of the fragments of the unique section;
(c) generate multiple mid- level sub-trees, wherein each of the mid- level sub-trees comprises link to at least one of the low level sub-trees;
(d) generate a top level sub-tree that comprises multiple section links, wherein each of the section links links to one of the mid-level sub-trees;
(e) create metadata descriptive of at least one of the sub-trees generated, wherein the metadata comprises data which is not comprised in the source document; and
(f) generate a structured document that comprises the top level sub-tree, at least some of the mid-level sub-trees and at least some of the low level sub-trees, and the metadata;

wherein a generation of the structured document comprises writing the structured document to a tangible memory;

wherein the processor is further adapted to:
retrieve one of the objects, wherein a retrieval of one of the object comprises acquiring from the to level sub-tree a link to a mid-level sub-tree, acquiring from the mid-level sub-tree a link to a low level sub-tree and retrieving the object from the low level sub-tree; and create an event handler for a sub-tree wherein the event handler is included in the sub-tree;

wherein the system comprises an event manager, configured to carry out an action which is indicated in an event handler that is stored in one of the generated sub-trees, if an event that is indicated in the event handler occurred.

14. The system according to claim 13, wherein the processor is further configured to create for a sub-tree selected from a group consisting of the low level sub-trees and the mid-level sub-trees an inverse link to a higher-level sub-tree, and incorporating the inverse link as a node of the sub-tree.

15. The system according to claim 13, wherein the processor is further configured to create for a sub-tree selected from a group consisting of the low level sub-trees and the mid-level sub-trees a reference link to a document, other than the structure document, which links to the sub-tree.

16. The system according to claim 13, comprising a retrieving module configured to retrieve at least one of the objects, by acquiring from the top level sub-tree link to a mid-level sub-tree, acquiring from the mid-level sub-tree a link to a low level sub-tree, and retrieving the object from the low level sub-tree.

17. The system according to claim 16, wherein the processor is further configured to process information of one of the sub-trees to generate a unique identifier of the sub-tree, wherein the retrieving module is configured to retrieve the at least one object in response to identifier information, in response to a result of at least one comparison of the identifier information to the unique identifier of at least one sub-tree.

18. The system method according to claim 16, wherein the processor is further configured to create a content indicative node for at least one of the sub-trees selected from a group consisting of the low level sub-trees and the mid-level sub-trees, wherein the content indicative node comprises information indicative of a type of at least a portion of the content of the sub-tree, wherein the retrieving module is configured to retrieve the at least one object in response to a result of a search for the type of the content.

19. The system according to claim 13, wherein the processor is further configured to process information of one of the sub-trees to generate a unique identifier of the sub-tree, wherein the system comprises an updating module configured to selectively update the sub-tree with updated information, in response to a result of a comparison of identifier information of the updated information to the unique identifier.

20. The system according to claim 13, comprising an updating module configured to update a sub-tree selected from a group consisting of the low level sub-trees and the mid-level sub-trees, and to update at least one sub-tree that links to the updated sub-tree, to comprise links to the updated version of the sub-tree, and to an old version of the sub-tree.

21. The system according to claim 13, comprising an updating module, configured to receive user selection information indicative of a selection of one or more of the objects, and to update at least one sub-tree which refers to at least one of the selected object in response to the information received from the user.

22. The system according to claim 13, wherein the processor is further configured to analyze content of the source document, prior to the generating of at least one of the sub-trees, to determine effectiveness of structuring the source document, and to selectively generate at least one of the sub-trees in response to a result of the determining.

23. The system according to claim 13, wherein the processor is configured to create semantic tags for multiple sub-trees of the structured document, to create a tag cloud of semantic tags for one of the sub-trees; to create a tag cloud of semantic tags of at least a portion of the structured document which excludes the sub-tree; and to create metadata in response to a result of a comparison between the tag clouds.

24. The system according to claim 13, wherein the processor is further configured to select multiple sub-trees of two or more documents in response to content of a base-node; to create for each of the selected sub-trees metadata information that pertains to the base-node; to generate the mid-level sub-trees which are binding at least two of the selected sub-trees; and to generate the top level sub-tree which links to the mid-level sub-trees that binds the selected low level sub-trees.

* * * * *